United States Patent [19]

Densmore

[11] 4,433,777
[45] Feb. 28, 1984

[54] CONVEYOR BELT DRIVE SPROCKET

[75] Inventor: Neal W. Densmore, Franklin, Pa.

[73] Assignee: Joy Manufacturing Company, Pittsburgh, Pa.

[21] Appl. No.: 333,594

[22] Filed: Dec. 23, 1981

Related U.S. Application Data

[62] Division of Ser. No. 80,760, Oct. 1, 1979, Pat. No. 4,339,031.

[51] Int. Cl.³ ............................................. B65G 23/06
[52] U.S. Cl. .................................... 198/834; 474/155
[58] Field of Search ................ 198/834; 474/152, 153, 474/155

[56] References Cited

U.S. PATENT DOCUMENTS

| 1,134,688 | 4/1915 | McWhorter | 198/834 |
| 1,724,150 | 8/1929 | Webb | 198/834 |
| 3,314,526 | 4/1967 | Franek et al. | 198/834 |
| 4,282,971 | 8/1981 | Becker | 198/834 X |

Primary Examiner—Jeffrey V. Nase
Attorney, Agent, or Firm—Raymond W. Augustin

[57] ABSTRACT

An improved drive sprocket for driving a chain is set forth. The drive sprocket contains a plurality of peripheral drive teeth having a leading drive surface thereon. The sprocket has a first pair of teeth spaced a predetermined circumferential distance from each other on a pitch circle about the sprocket and a third tooth being spaced a distance less than the above mentioned predetermined distance from the trailing tooth of the first pair of teeth. The leading drive surface of each tooth engages and drives the chain around the sprocket.

1 Claim, 24 Drawing Figures

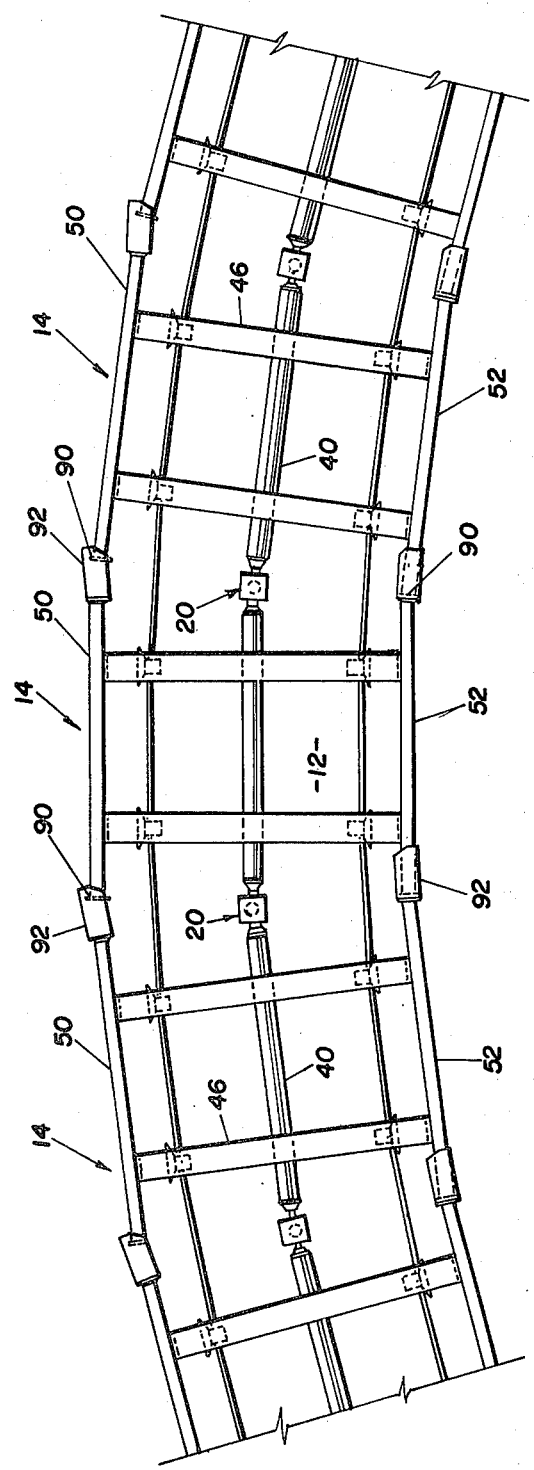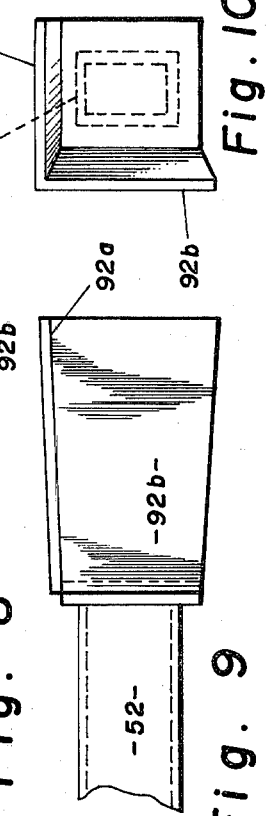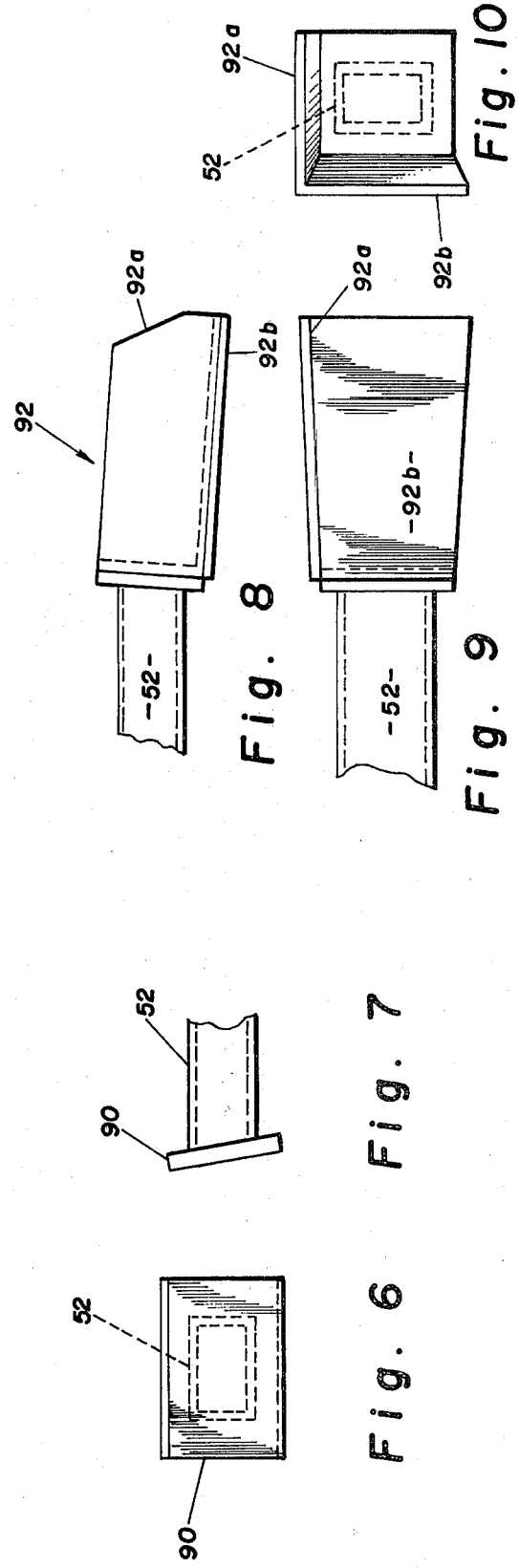

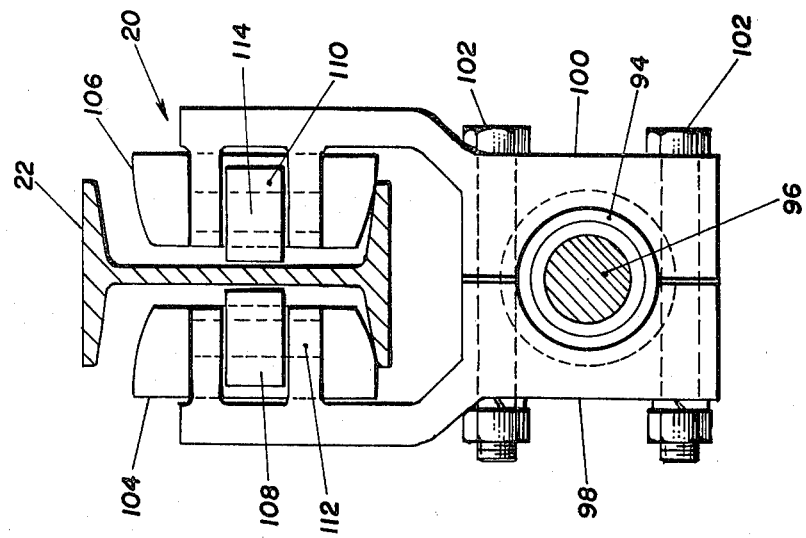
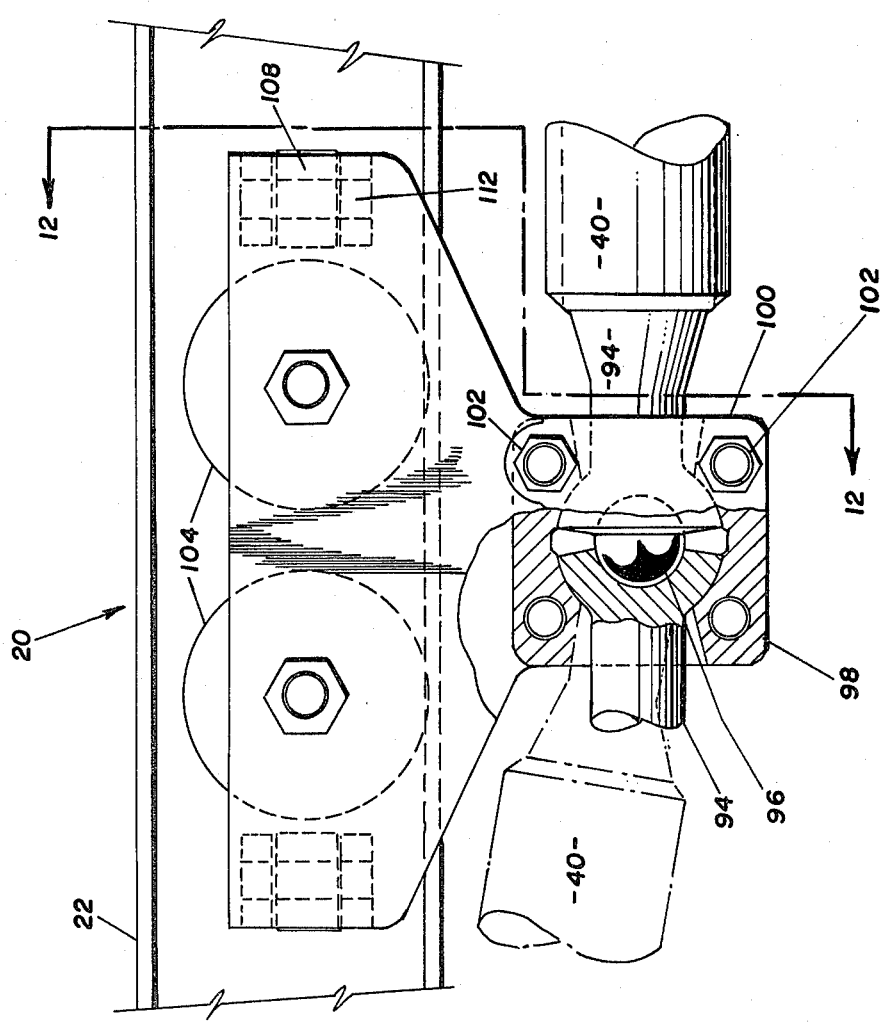
Fig. 12
Fig. 11

CONVEYOR BELT DRIVE SPROCKET

CROSS REFERENCES TO RELATED APPLICATIONS

This application is a division of Ser. No. 80,760, filed Oct. 1, 1979, now U.S. Pat. No. 4,339,031, issued July 13, 1982.

1. "Conveyor belt" by Merle L. Hoover, U.S. Ser. No. 69,664 filed Aug. 24, 1979, now abandoned in favor of continuation U.S. Ser. No. 224,419, filed Jan. 12, 1982.

2. "Conveyor Belt Chain and Method for Its Use" by Harry R. Becker, U.S. Pat. No. 4,282,971, issued Aug. 11, 1981.

3. "Conveyor System Having An Inby Terminal Connected to a Bridge Conveyor for Unitary Movement Therewith", by Neal W. Densmore and Donald E. McDaniel, U.S. Ser. No. 80,851, filed Oct. 1, 1979.

BACKGROUND OF THE INVENTION

1. Field of the Invention

The present invention relates to conveyor systems, and, more particularly, is directed to an articulated conveyor adapted to be suspended from an overhead monorail and capable of traversing a curvilinear path.

2. Description of the Prior Art

In mining operations, especially underground mining operations, such as, coal mining or the like, conveyors or series of conveyors are used to transport the mined ore from the mine. Normally, there is a main conveyor that moves the mined material along a fixed path. The main conveyor has a terminal end at a fixed location for receiving the material being mined. In the past, shuttle cars or other short distance haulage vehicles have been used to transport the mined material from the mining machine to the fixed terminal end of the main conveyor. The use of shuttle cars and other such haulage vehicles is intermittent, time consuming, and inefficient in not providing for the continuous transport of the mined materials from the mining machine to the fixed conveyor. Thus, in more recent years there have been several developments directed toward a mobile articulated conveyor that provides for continuous transport of the discharge of a continuous miner to the main conveyor as the miner advances into the mine face and changes the direction of its forward movement. Such mobile articulated conveyors are particularly adaptable to "room and pillar" type coal mining operations wherein the mobile conveyor follows the continuous miner and changes in direction as the machine penetrates into the mine face in one room and then is backed out and set to work in the mine face of another room while roof bolts are installed in the recently mined room. The mining machine is then backed out of this second room and set to work in either the recently roofbolted room or it may go on to still another room.

One of these more recently developed mobile articulated conveyors is shown in the Payne et al. patent, U.S. Pat. No. 3,707,218, and sold under the trade designation "Serpentix". The Serpentix conveyor has an endless trough shaped, accordion-pleated belt supported on a vertebrae-like member which, in turn, is supported on the mine floor by stanchions. The stanchion supported conveyor was cumbersome and did not lend itself to frequent shifting of the conveyor path from room to room. Thus, Craggs, as shown in U.S. Pat. No. 3,920,115, suspended the Serpentix conveyor from an overhead monorail and thereby provided a flexible frame conveyor which could be attached to the surge car behind a mining machine. The conveyor could now follow the mining machine as it moved from one room to another in performing its mining operation.

Another development is such mobile articulated conveyors is disclosed in McGinnis U.S. Pat. No. 3,701,411 which shows a conveyor comprised of an endless belt supported on a train of pivotally interconnected portable cars or carriages. Each of the carriages are supported on ground engaging wheels thereby providing mobility to the conveyor. A self propelled tractor is connected to the conveyor train to move it from one location to another. Another development along the same lines can be found in U.S. Pat. No. 3,863,752.

A later McGinnis patent, U.S. Pat. No. 4,061,223, discloses a mobile articulated conveyor suspended from an overhead monorail. Shown is a U-shaped conveyor belt carried by a plurality of individual carriage units suspended from the overhead monorail. The carriage units are fastened to one another by a resilient, flexible spline member which provides for positioning of the carriage units around vertical and horizontal curves. The conveyor belt is driven by a separate power belt and guided by guide rollers.

Although, the above-referenced developments have made an advancement in the art of mobile articulated conveyors, each has encountered specific problems and does not perform as satisfactorily as desired. Along with suffering from the shortcomings of being expensive, cumbersome, bulky, complex structures, with some having a high silhoutte, these referenced developments have experienced problems in maintaining the upper conveying run portion of the belt in a suitable load conveying mode as the conveyor moves around horizontal and vertical curves. Further, these prior conveyors do not provide a smooth path for the belt to follow around curves, thus pinching the belt and causing excessive wear thereto.

SUMMARY OF THE INVENTION

The preferred embodiment of the conveyor system, as disclosed herein, includes various unique features for facilitating the transport of materials from a first location, such as an area where a continuous miner is working, to a second location, such as where the receiving end of a second conveyor is positioned, wherein the travel path defined between the first and second locations includes horizontal and/or vertical curves.

While these unique features are particularly adapted for conveying materials along a curvilinear path such as experienced in underground mining operations, it will be readily apparent that some of such features may be incorporated, either singly or together, into above ground conveying systems for conveying materials along either linear or curvilinear paths, as well as, for conventional above and below ground flexible conveyors and thereby improve the same. Also, some of these features comprise inventions in other copending applications, cross referenced above; however all are illustrated and described herein for facilitating a complete and thorough understanding of those of the features comprising the present invention.

It is, accordingly, the principal object of the present invention to provide a conveyor system with an articulated conveyor in which the aforementioned problems of the prior art have been overcome and which is simple and inexpensive in structure, reliable in operation, and is so constructed to present a low profile enabling the same to maneuver around pillars and through low clearance passageways.

More particularly, an object of the present invention is to provide an improved articulated conveyor which is adapted to be suspended from an overhead rail and which is capable of traversing a curvilinear path while maintaining the conveying run portion of an orbital conveying belt in a predetermined operative mode.

More specifically, an object of the present invention is to provide an articulated conveyor which includes a train of carriages suspended from an overhead monorail with each carriage cooperating with an adjacent carriage so as to selectively limit the lateral swing of one carriage relative to an adjacent carriage in thereby maintaining the carriage train in a predetermined disposition relative to the monorail as the same moves along the monorail.

Yet another object of the present invention is to suspend the carriages a relatively short distance below the monorail so as to decrease the tendency of the carriages to swing in a transverse direction as the carriage moves longitudinally along the monorail.

Still another object of the present invention is to provide a conveyor with an improved traction drive means for moving a mobile articulated conveyor along an overhead rail while substantially eliminating any binding and other deleterious forces normally associated with, or resulting from, moving a rigid member through horizontal and/or vertical curved paths.

Still further, an object of the present invention is to provide a conveyor with a traction drive means wherein the configuration is such that a conveyor can be driven from either one of its ends or from an intermediate section thereof while maintaining a low profile of the conveyor.

Another object of the present invention is to provide a conveyor with an improved sprocket for driving a chain which is attached to a prestretched orbital conveying belt so as to relieve any increase in tension in the belt due to the belt traveling around the drive sprocket, and thus, decrease wear to the belt and prolong its life.

In pursuance of these and other objects, the present invention sets forth a conveying system comprised of a plurality of tandemly disposed carriages that are connected to one another by an articulated joint so as to permit each carriage to move universally relative to an adjacent carriage and to permit the train of carriages to be moved in unison along a curvilinear path. Each of the carriages includes a framework defining an open extent extending longitudinally therethrough and constructed of an upper elongated link member disposed adjacent the overhead rail and a pair of traversely spaced apart, longitudinally extending side members disposed on opposite sides of the open extent and interconnected to the elongated link member, preferably, by a pair of longitudinal spaced downwardly projecting U-shaped frame members. The carriages further carry means for supporting an orbital belt which extends longitudinally within the open extent and preferably located between the upper elongated link member and the lower side members.

Mounted on the respective ends of adjacent link members are portions that form the articulated joint which thereby connect adjacent carriages and permit universal movement of one carriage relative to its tandemly disposed adjacent carriage. In the preferred embodiment, the carriage train is suspended from and below the overhead rail by suspension means cooperable with the rail and connected to the carriages via selected ones of the articulated joints.

Mounted on the ends of adjacent side members are structures that cooperate with one another so as to selectively limit the lateral movement of adjacent carriages relative to one another during the longitudinal movement thereof. More particularly, one of the side member end structures partially surrounds the side member end structures of an adjacent carriage with the cooperating ends structures being so positioned relative to one another such that one side member is permitted to move a given amount with respect to the other side member, and thereafter, the side member end structures engage one another so as to cause common movement thereof and thus preventing further swing of the carriages.

The articulated conveyor is moved along the monorail by drive traction means that includes at least a pair of transversely spaced apart rotatable traction drive wheels being disposed on the opposite sides of the rail. Driveably coupled to respective ones of the wheels is a pair of transversely spaced apart power units being disposed on opposite sides of the rail and pivotally connected to one another below the drive wheels. To maintain the drive wheels in drive traction relationship with the rail, pivot means, preferably in the form of an actuator transversely disposed and interconnected between respective lower portions of the power units, are provided and operable to pivot the power units toward and away from one another and thus move the drive wheels toward and away from one another so as to maintain the drive wheels in drive traction relationship with the overhead rail.

Additionally, the drive traction means includes an elongated framework suspended from the rail and disposed within the vicinity of the power units. The framework is connected to at least one of the carriages and includes end portions spaced longitudinally outwardly from the opposite longitudinal ends of the power units with a rigid frame member interconnecting the opposite end portions. The respective ends of the power units are connected to respective end portions of the framework by link means, preferably in the form of a flexible chain. Upon movement of the power units in one direction, one of the chains is put in tension in providing a force transmitting path through the rigid frame member to an adjacent carriage. Upon movement of the drive unit in the opposite direction, the other one of the chains is put in tension so as to provide a force transmitting path through the rigid frame member. The chain not in tension is relaxed and incapable of transmitting a force through the rigid frame member.

The present invention further includes an improved sprocket for driving the conveyor belt. The drive sprocket comprises a plurality of teeth arranged in sets of three around the periphery of the sprocket with the first two teeth of each set being spaced a given distance from each other on a circumferential pitch circle on the sprocket. The third tooth of each set being spaced a distance less than the given distance from the trailing one of the first two teeth of each set. The third tooth also constitutes the first tooth of the succeeding set.

The present invention also includes the method of relieving the tension in the belt as it travels around the drive sprocket by moving the links of the chain toward one another into a closer longitudinal spacing between each other during portions of their path of travel about the sprocket than the longitudinal spacing between the links as they enter and exit from the sprocket.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 5 is a top plan view showing the arrangement of the carriages as they pass around a horizontal curve.

FIG. 6 and 7 show an end view and a side elevational view respectively of one end structure of one of the side members which form a portion of the limiting means.

FIG. 8, 9 and 10 respectively show the top plan, side elevational and end view of the other one of the end structures that form the other portion of the limiting means.

FIG. 11 shows, on a somewhat enlarged scale, one of the articulated joints used for suspending the carriages from the monorail.

FIG. 12 is an end view of the articulated joint as seen along line 12—12 in FIG. 11.

DETAILED DESCRIPTION OF THE PREFERRED EMBODIMENT

In the following description, it is to be understood that such terms as "forward", "rearward", "left", "right", "upward", "downward", etc., are words of convenience and are not to be construed as limiting terms.

In General

Figure 1:
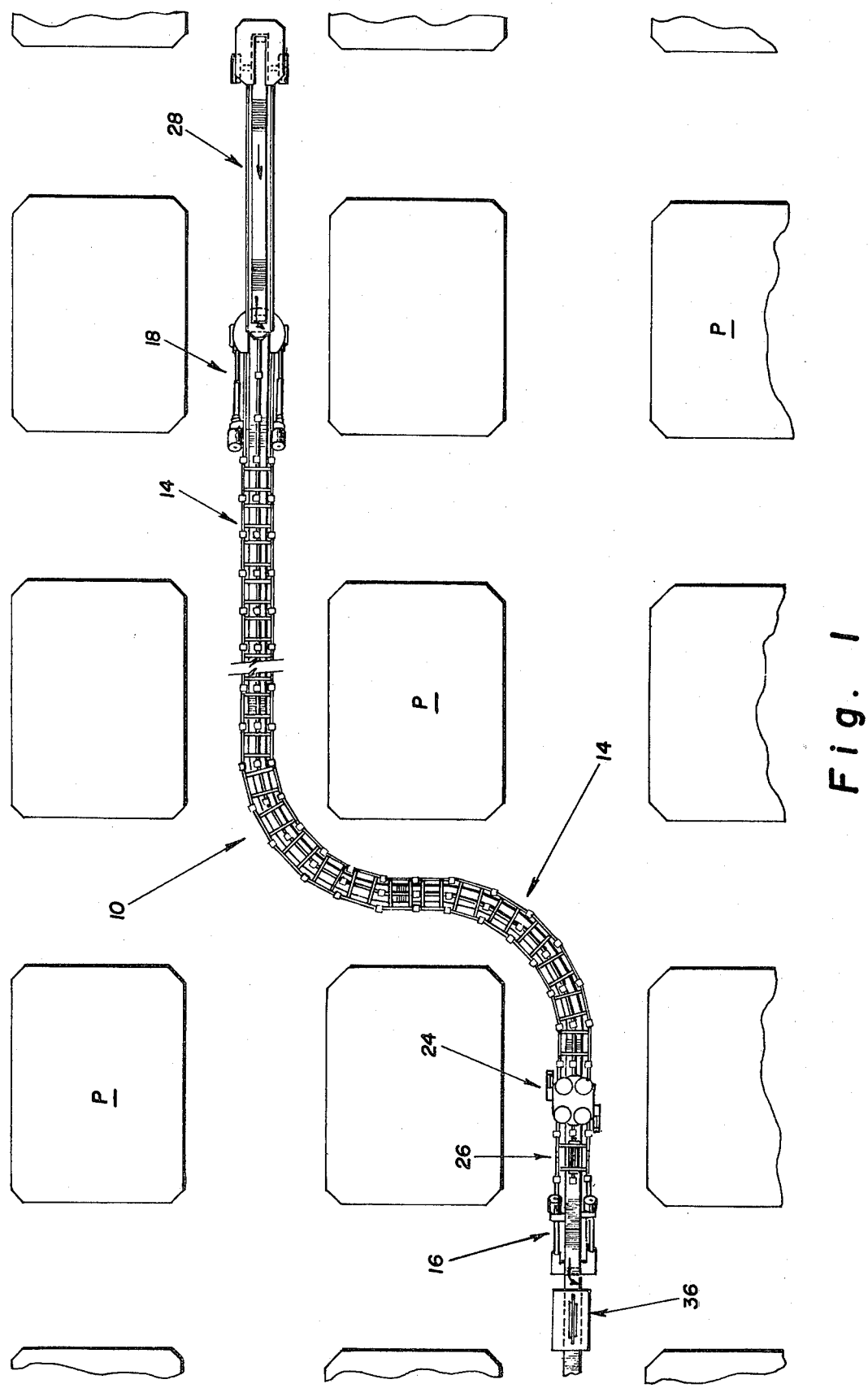
FIG. 1 is a diagrammatic plan view of the conveyor system embodying the principles of the present invention.
Figure 2:
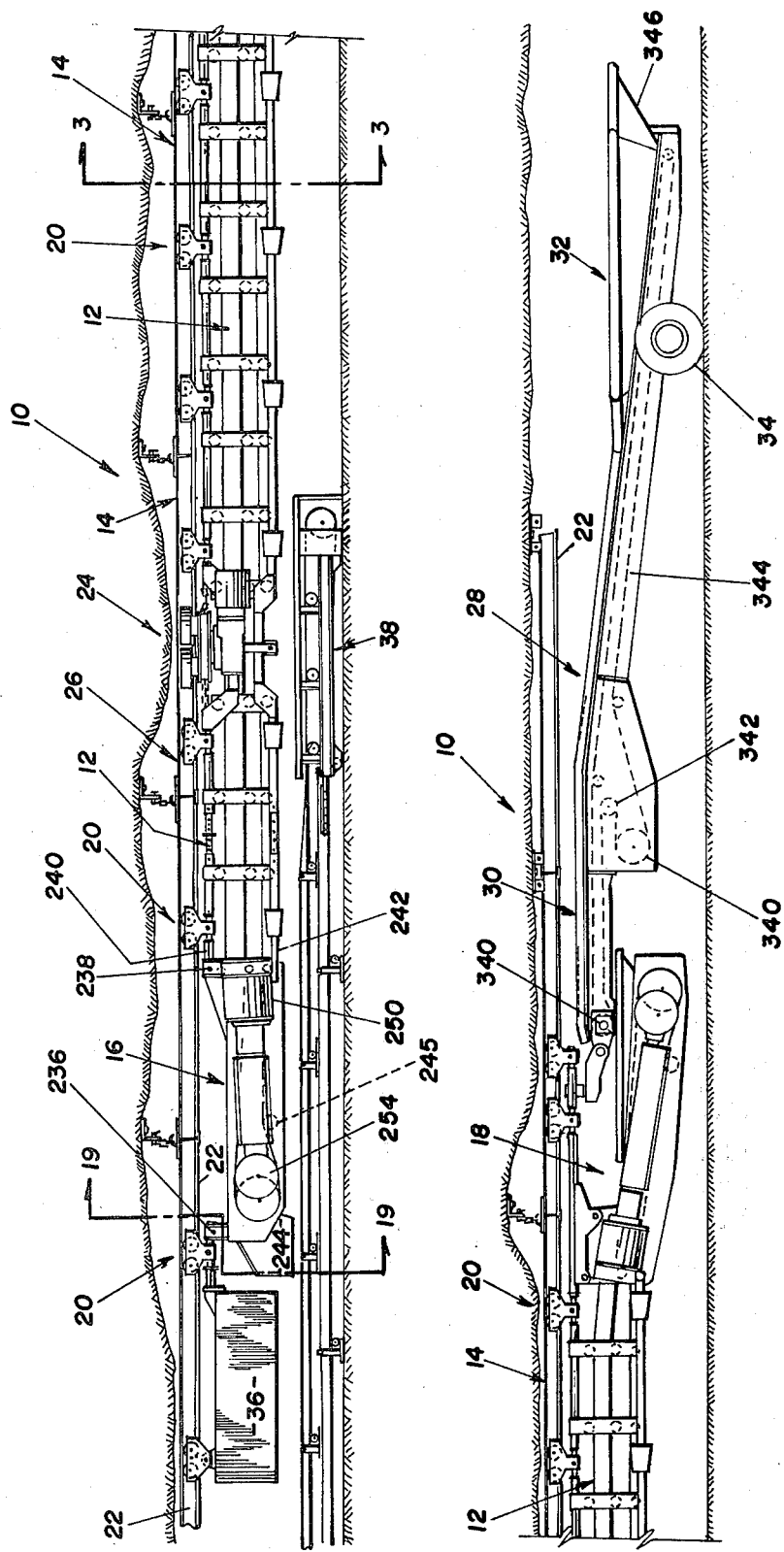
FIG. 2 is a fragmentary side elevational view of the conveyor system.

Referring now to the drawings, and particularly to FIGS. 1 and 2, there is shown a conveyor system having a mobile articulated conveyor which is adapted to be suspended from overhead rail means, such as a monorail, and which is capable of traversing a curvilinear path. The conveyor system is indicated generally by the numeral 10 and comprises the preferred embodiment of the present invention.

As shown in FIGS. 1 and 2, the conveyor system 10 generally includes an articulated conveyor having an orbital conveying belt 12 carried by a train of tandemly disposed, carriages 14 with an outby terminal 16 located at one end of the train and an inby terminal 18 located at the opposite end of the train; means 20 cooperable with each of the carriages 14 and the overhead supported rail means, such as monorail 22, for pivotally interconnecting the carriages 14 and suspending the carriages from the monorail 22; traction drive means 24 cooperable with the overhead monorail 22 and being connected to at least one of the carriages 14 for moving the train of carriages along the path defined by the monorail. An extendable/retractable unit, referred to herein as a take-up carriage 26, is interposed between a pair of adjacent carriages 14 or between the outby unit 16 and the traction drive unit 24 (as shown in FIG. 2) to increase or decrease the length of the carriage train to thereby provide proper tensioning of the orbital belt 12. Further, a bridge conveyor, generally indicated by the numeral 28, is connected to the inby terminal end of the carriage train for unitary movement therewith. The bridge conveyor 28 has one end, the discharge end 30, suspended from the monorail 22 and positioned above the inby terminal 18, whereas the other end, the material loading end 32, is supported on a pair of steerable wheels 33, 34 (only the right wheel being shown in FIG. 2).

The various controls for controlling the operation of the conveyor system 10 are housed within a control box 36 which is also suspended from the monorail 22 and is connected to the outby terminal 16 end of the carriage train. The control box 36 forms no part of the present invention and its specific structure will not be discussed in detail. Suffice it to say that it is a box or housing of conventional nature that houses the various control components for regulating the operation of the conveyor system.

Also seen in FIG. 2, is a stationary panel belt conveyor, being generally indicated by the numeral 38, of conventional construction and forming no part of this invention. The panel belt conveyor 38 is supported on the mine floor and positioned below the outby terminal 16 for receiving mined material discharged therefrom. As will be readily understood by those skilled in the art, the outby discharge terminal of the carriage train may reciprocate along the monorail 22, back and forth, over the panel conveyor 38 as the other end of the conveyor system, the bridge conveyor 28 follows a continuous miner (not shown) as it proceeds around horizontal and vertical curves from room to room, between pillars P, in extracting the mineral from the mine face, as seen in FIG. 1.

For illustration purposes, in the preferred embodiment, the orbital conveying belt 12 is of the type disclosed and claimed in the U.S. patent of Harry R. Becker, entitled "CONVEYOR BELT CHAIN AND METHOD FOR ITS USE" having U.S. Pat. No. 4,282,971 and issued on Aug. 11, 1981. The Becker belt is a precontrolled stretchable belt formed of a stretchable elastic material having a chain attached to the longitudinal centerline thereof for controlling the amount of prestretch of the belt as well as for driving the conveyor belt. However, it should be noted here that the conveyor system of the present invention is not limited to the incorporation of such a controlled prestretch belt, nor an elastic material belt per se, but includes a wide variety of types of conveying orbital belts.

The various above-mentioned components of the conveyor system 10 will now be described in further detail hereinafter.

Carriages

As discussed above, a plurality of carriages 14 are disposed below the monorail 22 and arranged in single file fashion to form a carriage train. Each of the carriages 14 is constructed so as to define an open extent extending generally longitudinally through the train thereof with each carriage 14 mounting means for supporting an orbital belt within the open extent of the carriage train. Since, in the preferred embodiment, all of the carriages 14 are identical, only one will be discussed in detail.

Figure 3:
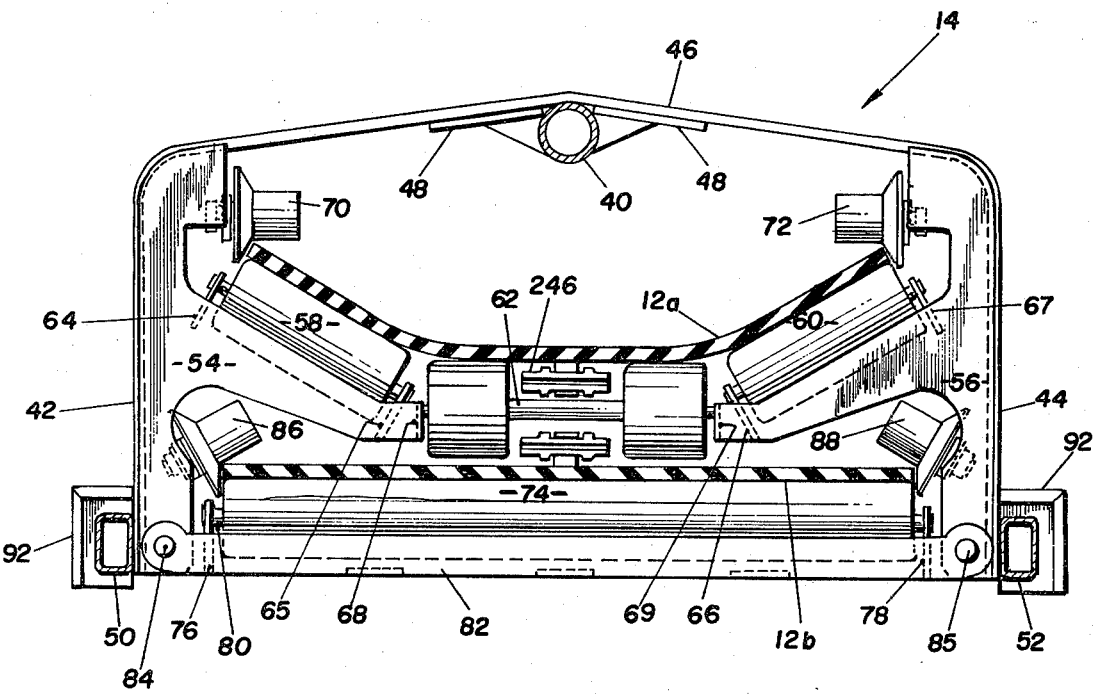
FIG. 3 is an enlarged sectional view of a carriage as taken along line 3—3 of FIG. 2.
Figure 4:
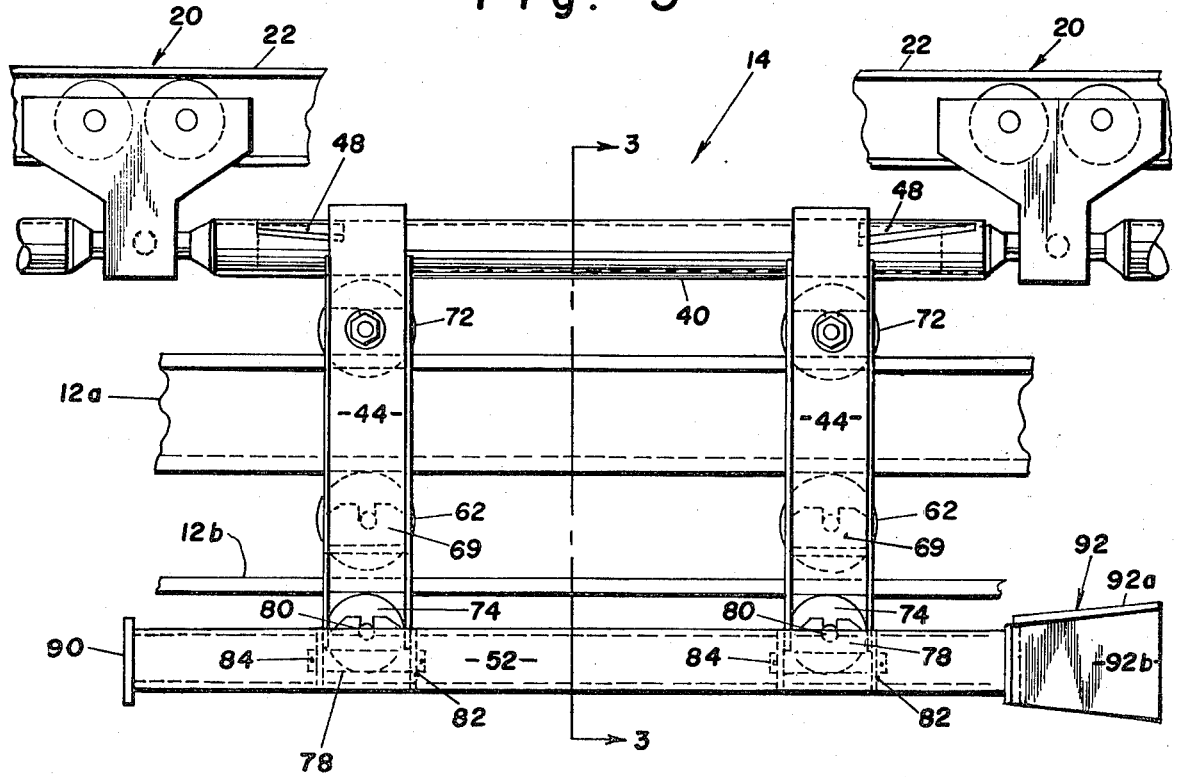
FIG. 4 is a side elevation view of the carriage shown in FIGS. 2 and 3.

As seen in FIGS. 3 and 4, each carriage 14 includes a framework having an upper elongated tubular link member 40 and a pair of downwardly projecting, generally inverted U-shaped members depending from and spaced apart along the tubular link member 40. Each of the U-shaped members have left and right leg portions 42, 44 (only the right leg portion 44 of each U-shaped frame member being seen in FIG. 4) respectfully defining the outer lateral sides of the open extent and being interconnected by an upper bight portion 46 defining the upper boundary of the open extent. The U-shaped frame members are constructed from a flat metal bar and are longitudinally spaced along and inwardly from the respective ends of the elongated tubular link member 40. More specifically, the elongated tubular link member 40 is secured to the undersurface of the bight portion 46 of the respective frame members by welding or the like, and preferably, the tubular link member 40 is positioned centrally of each bight portion. For increased strength, webs 48 are welded between the tubular link member 40 and the respective bight portions. When each carriage 14 is suspended from the monorail 22 in a manner to be described below, its elongated tubular link member 40 is disposed a relatively short distance below and generally parallel to the monorail 22.

As also seen in FIGS. 3 and 4, the framework of each carriage 14 includes left and right longitudinally the opposite sides of the open extent and positioned generally at a lower level than the elongated tubular link member 40. The left side member 50 extends, generally horizontally, across the lower edge of the left leg portions 42 of the pair of frame members associated with a respective carriage whereas the right side member 52 extends, generally horizontally, across the lower ends of the right leg portions 44 of the pair of frame members associated with the same carriage. Preferably, the left and right side members 50, 52 are oriented generally parallel to one another and generally parallel to the elongated tubular link member 40. In the preferred embodiment, the longitudinal axis of the side members 50, 52 and the longitudinal axis of the elongated tubular link member 40 associated with each carriage 14 form the apices of an isosceles triangle.

A plurality of rollers comprise the means mounted on each carriage 14 for moveably supporting the orbital conveying belt within the open extent of the carriage train. An upper series of rollers are provided for supporting the upper conveying run portion 12a of the belt 12 and a lower series of rollers are provided for supporting the lower return run portion 12b of the belt 12. The rollers are supported on left and right brackets 54, 56 respectively (as seen in FIG. 3) which project inwardly into the open extent from the respective leg portions 42, 44 of each frame member. Each of the brackets 54, 56 is formed by a pair of spaced apart plates suitably fastened to the outer edges of the respective leg portion. The plates are identical and irregular in shape forming cantilever arms that project into the open extent.

In the preferred embodiment, the upper conveying run portion 12a of the belt 12 is supported by respective left and right troughing idlers 58, 60 and a centrally disposed dumbell idler 62 so as to maintain the belt 12 in a cross-sectional trough-shaped configuration, as shown in FIG. 3. The left troughing idler 58 is rotatably mounted on the cantilever arm portion of the left bracket 54 by a pair of spaced plates 64, 65 transversely disposed between the bracket side plates. The upper end of each mounting plate 64, 65 is notched to receive the respective shaft ends of the idler 58. The right troughing idler 60 is similarly rotatably mounted between the bracket side plates which form the cantilever arm portion of the right wing bracket 56 by a pair of similar notched mounting plates 66, 67. For the sake of clarity, the left and right troughing idlers 58, 60 along with their respective mounting plates 64–67 have not been shown in FIG. 4. The dumbell idler 62 is transversely disposed between the respective cantilever arm portions of the left and right brackets 54, 56 and rotatably supported on notched plates 68, 69 secured between the side plates that form the respective arm portions. Idler 62 takes on the dumbell shape so as to accomodate space for the chain that is attached to the belt 12 which will be discussed later in more detail. As can be easily understood, such mounting of the troughing idlers 58, 60 and dumbell idler 62 permits easy removal of same and ready access to belt 12.

For maintaining the upper conveying run portion 12a of the orbital belt 12 in an operative position on the troughing idlers 58, 60 and the dumbell idler 62, each carriage 14 is provided with respective left and right upper edge idlers 70, 72 which, in the preferred embodiment, are of capstan shape. The left edge idler 70 is rotatably supported between the upper portion of the side plates that form the left bracket 54 whereas the right edge idler 72 is rotatably supported between the side plates that form the right bracket 56. As best seen in FIG. 3, the left and right edge idlers 70, 72 project into the open extent, toward one another, and are generally horizontally disposed having their tapered flange portions being disposed adjacent the respective outer edges of the orbital belt 12.

The return run portion 12b of the orbital belt 12 is supported on a transversely disposed return idler 74 rotatably mounted on respective left and right mounting plates 76, 78 which are also notched to receive the respective left and right ends of idler shaft 80. The mounting plates 76, 78 are suitably secured between the flange of a channel member 82 that interconnects the lower ends of the respective left and right leg portions 42, 44 of each U-shaped frame member. The respective ends of the channel member 82 are attached to the respective leg portions by pins 84, 85 that pass through aligned apertures provided in the flange of the channel member and through the side plates that form the left and right brackets 54, 56. The belt return run portion 12b is maintained on the return idler 74 by left and right edge idlers 86, 88 rotatably supported on a lower portion of respective left and right brackets 54, 56. As seen in FIG. 3, the lower edge idlers 86, 88 are disposed below the cantilever arm portions of the respective brackets and are so positioned as to engage the outer edges of the return run portion 12b of the belt 12. It should be appreciated another feature of the invention is that the mounting of the return idler 74 provides easy access to the belt 12 as well as easy access to the upper conveying run idlers 58, 60 and 62. The return idler 74 can be easily removed by removing the channel member attaching pins 84, 85, whereas, the upper conveying run idlers 58, 60 and 62 can be removed by lifting them out of their respective notched mounting plates. Preferably, as seen in FIG. 4, the upper conveying run idlers 58, 60, 62 and the return run idler 74 are so positioned that the respective axes thereof lie in a generally vertical plane.

Each carriage 14 is further provided with means for limiting the lateral movement of one carriage relative to the aligned position of an adjacent carriage to thereby maintain the conveying run portion 12a of the orbital belt 12 in a predetermined operative mode as the train of carriages are moved along the overhead monorail 22. In the preferred embodiment, the limiting means are provided on the respective ends of each side member 50, 52 of each carriage. The limiting means of one side member end of a respective carriage, cooperates with the adjacent end of the side member carried by the adjacent carriage such that each carriage can only move laterally a limited amount independently of the lateral movement of the adjacent carriage and thereafter the carriages move together in common movement. As seen in FIG. 4, on the left end of the right side member 52 the limiting means takes the form of a generally upright plate 90 (see FIGS. 6 and 7) secured to the terminal end of the side member. Mounted on the right end of the right side member 52 the limiting means takes the form of an L-shaped configuration, being generally indicated by the numeral 92, formed from an upper plate 92a that slants upwardly and outwardly from the terminal end and a side plate 92b that slants away and outwardly from the terminal end (see FIGS. 8, 9, 10).

On a straight-run section of the monorail 22, wherein the carriages 14 are generally aligned with the longitudinal centerline of the respective side members of adjacent carriages being in alignment, the respective limiting means cooperate such that the L-shaped plate structure 92 of one side member end partially surrounds the upright plate structure 90 of the adjacent side member end. In such straight line positions the respective cooperating plate structures are in a non-contacting relationship; however, in a curve section of the monorail 22, such as seen in FIG. 5, wherein one carriage is angularly disposed relative to an adjacent carriage, the respective cooperating plate structures of adjacent right side members 52 are in engagement thereby transferring the load of one carriage onto another which tends to retard the swinging movement of one carriage relative to its adjacent carriage. Furthermore, the abutting relationship of the plate structures 90 and 92 also assists in retarding the lateral swing of adjacent carriages. As will be noted, the cooperating plate structures at the adjacent ends of adjacent left side members 50 are spaced farther apart than their relative position in a straight run section. The cooperation of the plate structures at the ends of the side members 50, 52 of adjacent carriages 14 as described above limits the lateral swinging movement of the carriages as they move along the overhead rail, thus providing a smooth path for the conveying run portion 12a of the belt 12.

Means for Suspending and Connecting Carriages

As described above, the carriages 14 are tandemly disposed, being connected to one another, and are suspended from the overhead monorail 22 as shown in FIG. 2.

With specific reference to FIGS. 11 and 12, there is illustrated in greater detail the means for connecting the carriages and for suspending the carriages from the monorail. Secured to each end of each elongated tubular link member 40 of a carriage framework is a yoke member 94 that projects outwardly therefrom having an end portion which defines a concave ball receiving socket adapted to partially receive a ball, such as ball 96. As best seen in FIG. 11, the yoke members 94 associated with the adjacent ends of adjacent link members 40 are positioned around the ball 96 with an annular gap existing therebetween for retaining a lubricant therewithin. The respective yoke members 94 are clamped about the ball 96 by left and right blocks 98, 100 (see FIG. 12) each having a cavity therewithin such that when the blocks are clamped together they form a cavity which takes the shape of the outer periphery of the respective yoke members 94, and further define conical or tapered slot sections on opposite sides of the cavity which allow the link members 40 to move up and down in the vertical direction and from side to side in the horizontal direction whereby adjacent link members are permitted to move relative to one another. Fastening bolts 102 are used to hold the blocks 98, 100 together (see FIG. 12). As described, the above components form an articulated joint.

Each of the blocks 98, 100 have integral trolley support members extending upwardly therefrom for rotatably supporting therebetween respective left and right pairs of trolleys or wheels 104, 106 which are cooperable with the monorail 22 for movement therealong. For centering the trolley wheels 104, 106 on respective sides of the I-shape monorail 22, left and right guide rollers 108, 110 respectively are provided for rolling contact with the respective sides of the web portion of the I-beam. The guide rollers 108, 110 are rotatably supported on pins 112, 114 that extend between upper and lower inwardly extending projections of the upright integral trolley support members.

As will be easily understood by those skilled in the art, suspending of the carriages 14 from the articulated joints that connect the carriages permits the use of smaller joints in that the stress forces that are transmitted to the joints are transferred to the more rigid I-beam, thereby reducing wear and damage to the joints.

Traction Drive Means

Figure 13:
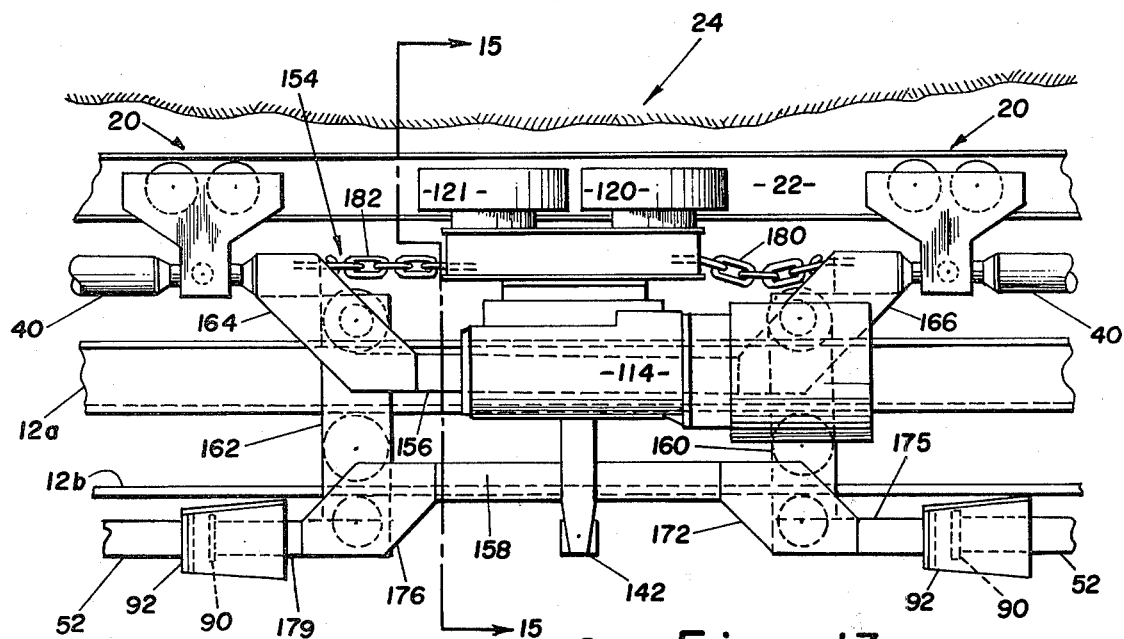
FIG. 13 is an enlarged side elevational view of the drive traction means seen in FIG. 2.
Figure 14:
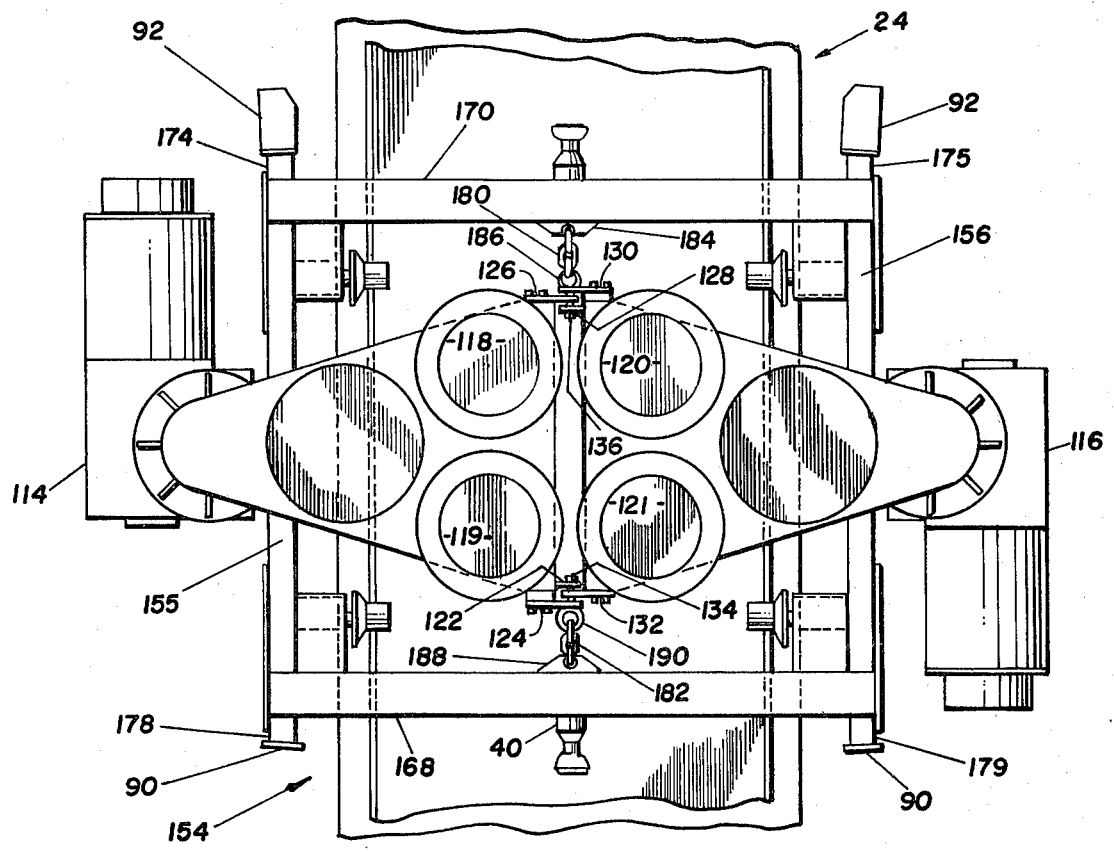
FIG. 14 is a top plan view of the drive traction means shown in FIG. 13.
Figure 15:
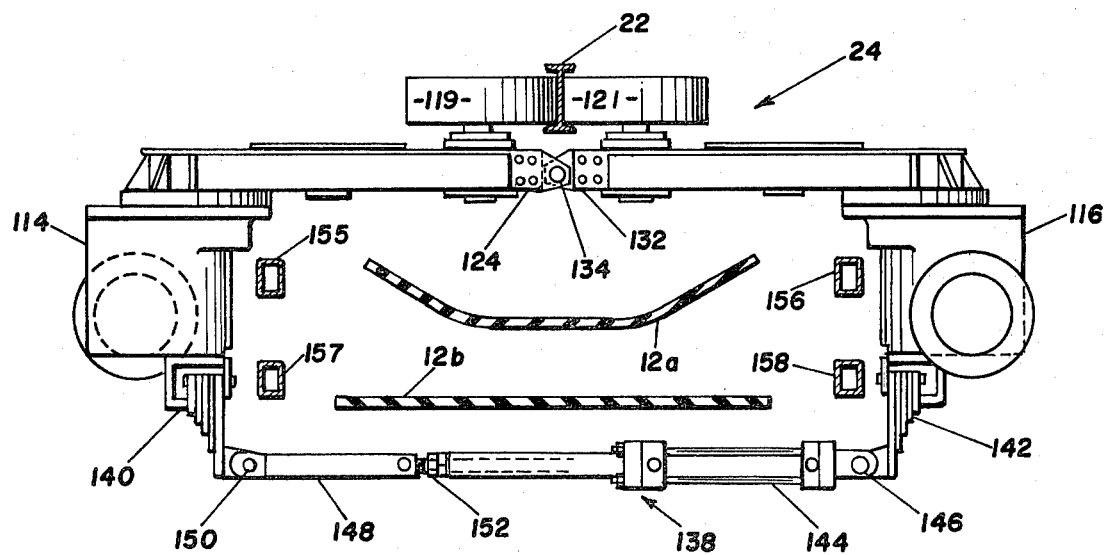
FIG. 15 is a sectional view of the drive traction means as taken along line 15—15 on FIG. 13.

Relocation of the conveyor system 10 along the overhead monorail 22 is achieved by actuation of the traction drive means 24 seen in FIGS. 13, 14 and 15. While in the preferred embodiment there is shown only one traction drive unit being interposed between two carriages; however, depending on the length of the conveyor and the elevated grade which it traverses, there may be several traction drive units associated with a conveyor. Furthermore, the traction drive unit may be located at either end of the conveyor, or, as shown in the preferred embodiment, the traction drive unit may be located between adjacent carriages.

As best seen in FIG. 15, the traction drive means 24 basically includes a pair of transversely spaced apart left and right power units 114, 116 respectively disposed on opposite sides of the open extent of the carriage train, each unit having driveably coupled thereto a pair of traction drive wheels with the wheels being associated with the left power unit 114 being referred to by numeral 118, 119 while the drive wheels associated with the right power unit 116 being referred to by the numeral 120, 121. The respective drive wheels 118, 119 of the left power unit 114 are rotatable in opposite directions and cooperable With the opposite sides of the monorail 22 from that of the respective drive wheels 120, 121 of the right power unit 116.

Since the specific components of the power units 114, 116 may be conventional, it should suffice to say that each drive unit has a housing which supports a motor and a drive train, such as a gear train or chain and sprocket drive, that transmit power from the motor to the drive shafts which support the respective drive wheels for rotation of same. Such driven rotation of the drive wheels 118, 119, 120 and 121 results in movement of the traction drive means 24 along the monorail 22. As shown in the preferred embodiment, the left and right power units 114, 116 are identical in construction but are reversely orientated on opposite sides of the monorail 22.

As stated above and as best seen in FIG. 15, the left and right power units 114, 116 are respectively disposed on opposite sides of the open extent of the carriage train having their respective housings projecting generally vertically and outwardly from the opposite sides of the open extent and with their respective drive components extending generally horizontally, and slightly above the upper boundary of the open extent, from the housing inwardly to the respective drive shafts for rotating the drive wheels 118, 119, 120 and 121. As seen in FIG. 14, stub arms 122, 124 are attached to one side of the left power unit housing 114 and projects inwardly therefrom and stub arm 126 is attached to the opposite side of the left power unit housing 114 projecting inwardly therefrom, whereas, corresponding stub arms 128, 130 and 132 are attached respectively to the opposite side of the housing of the other or right power unit 116 and project inwardly therefrom. The left and right units 114, 116 are pivotally coupled to one another by two pivot pins, one pin 134 passing through aligned aperatures provided in stub arms 122, 124 and 132 and the other pivot pin 136 passing through aligned apertures provided in stub arms 126, 128 and 130. As best seen in FIG. 15, the above described pivot connection of the left and right power units 114, 116 is disposed a relatively short distance below the monorail 22 with the axis of the pivot pins 134, 136 lying generally within a vertical plane that passes through the longitudinally centerline of the I-beam web section.

As best seen in FIG. 15, means in the form of an actuator assembly, generally indicated by the numeral 138, have been provided to pivot the left and right power units 114, 116 and therewith the left and right pairs of drive wheels 118, 119, 120 and 121 toward and away from one another and about the pivot pins 134, 136 so as to maintain the drive wheels 118, 120 in drive traction relationship with the overhead monorail 22. The actuator assembly 138 is pivotally interconnected between the lower ends of left and right leaf springs 140, 142 respectively, the left leaf spring 140 is attached at one end to the bottom of left power unit housing 114 and projects downwardly therefrom, while the right leaf spring 142 is attached to the bottom of the right power unit housing 116 and projects downwardly therefrom.

The actuator assembly 138 extends transversely between the lower ends of the springs 140, 142 and includes a transversely disposed cylinder 144, preferably hydraulic, having its cylinder end pivotably connected to the right leaf spring 142 by right pin 146. The piston rod end is threadably connected to one end of a threaded extension rod 148 that has its other end pivotally connected to the left leaf spring 140 by left pin 150. Fastening nuts 152 are threaded on the extension rod and piston rod and operable so as to lock the actuator assembly 138 in selected ones of the expanded and retracted positions of the hydraulic cylinder 144, thus retaining the power units 114, 116 in their relative pivoted positions in cases where a hydraulic leak occurs and the cylinder 144 looses pressure.

The operation of the actuator assembly 138 is such that upon extension of the cylinder 144, the power units 114, 116 pivot about the pivot pins 134, 136, with the lower ends of the power units being forced away from one another and with the upper ends moving closer to one another thereby causing the left and right pairs of drive wheels 118, 119, 120 and 121 to move toward one another, squeezing and pinching the monorail 22 therebetween and thus, resulting in drive traction relationship. Retraction of the cylinder 144 causes reverse pivot rotation of the power units, thereby resulting in less pressure being applied by the drive wheels 118–121 against the monorail 22.

The primary purpose of the leaf springs 140, 142 are to alleviate shock loading to the drive components associated with the drive wheels 118–121 as may be experienced in such circumstances wherein the sections of monorail 22 are not in perfect alignment which would tend to create an excessive force on the various connections and components when the drive wheels pass over such a disjointed rail juncture.

The traction drive means 24 further includes a framework, generally indicated by the numeral 154, having an open extent extending longitudinally therethrough and in general alignment with that of the carriage train for accommodating the orbital belt 12 in a manner similar to that of the above described carriages 14. The framework 154 is similar in structure to the carriages 14 but is modified to some extent for space allowance for the power units 114, 116. Furthermore, it will be seen from the following description that the framework 154 is connected to the carriages 14 and interconnected to the power units 114, 116 so as to transmit the movement force from the power units 114, 116 to the carriages 14 free from binding and other deleterious forces which normally would be associated with, or result from, moving a rigid member through a horizontal curve.

For clarity and to facilitate the understanding of the description, the end of the framework as seen in FIG. 13 toward the right side of the drawing will be referred to as the front end of the framework whereas the end of the framework on the left side will be referred to as the rear of the framework.

Now, with particular reference to FIGS. 13 and 14, the framework 154 is comprised of respective upper and lower longitudinally extending box shaped tubular side frame members 155, 156 and 157, 158 disposed on opposite sides of the open extent and interconnecting front and rear longitudinally spaced apart upright members 160, 162 respectively, disposed adjacent the opposite sides of the open extent (only the upright members on the right side are shown in FIG. 13). Mounted to and extending upwardly and rearwardly from the rear end of each of the upper side frame members 155, 156 is a diagonal plate 164 while another diagonal plate 166 extends upwardly and forwardly from the front end of each of the upper side frame members 155, 156. Spanning between the front and rear diagonal plates 164, 166 are front and rear transverse frame members 168, 170 respectively, the front frame member 168 being positioned a short distance forward of the front portion of the power units 114, 116 and the rear frame member 170 being positioned a short distance rearwardly of the rear portion of the power units 114, 116. Mounted on the forward face of the front frame member 168 and on the rearward face of the rear frame member 170, and downwardly a short distance from the vertex of each member, are outward projecting yokes which may be identical to those previously described yoke members 94 carried by the carriages 14 that form the above described articulated joint 20 for suspending the carriages 14 from the monorail 22.

Still referring to FIG. 13, secured to the front end of each of the lower side frame members 157, 158 and projecting generally downwardly and forwardly therefrom are lower front diagonal plates 172 that support front side member extensions 174, 175 which are vertically offset to the respective lower frame members 157, 158. Mounted on the outward end of the forward extensions 174, 175 are L-shaped plate structures identical to those plate structures 92 carried by the carriages 14 that form a portion of the cooperating limit means. Similar diagonal plates 176 are secured to the rear end of the lower side frame members 157, 158 for supporting vertical offset rearward extensions 178, 179 which have supported thereon the upright plate structure 90 as described above that forms the other cooperating portion of the limiting means.

As seen in FIGS. 13 and 14, the power units 114, 116 are connected to the framework 154 by front and rear flexible members illustrated as chains 180, 182 respectively. The front chain 180 is connected to a eyelet 184 mounted on the rear face of the front frame member 170 while the other end of the chain is connected to eyelet 186 mounted on the right pivot pin 136. The rear chain 182 is similarly connected to a eyelet 188 mounted on the front face of the rear frame member 168 and eyelet 190 mounted on pivot pin 134.

The traction drive unit as shown in FIG. 13 is depicted in an operative mode wherein the carriages 14 are moved or driven in the forward direction, further into the mine, which would be toward the right as seen in FIG. 2, and thus, the rear chain 182 is under tension whereas the front chain 180 is relaxed. In such forward movement, the carriages 14 to the left of the power units 114, 116 are pulled along the monorail 22 whereas the carriages 14 to the right of the power units 114, 116 are pushed along the monorail 22 by the forces transmitted from the carriage on the left and thru the framework 154 of the traction drive means. In other words, as the power units 114, 116 move forwardly, the line of force, of the carriages to the left, is through the rear chain 182 and through the successive elongated tubular link members 40 associated with each of said carriages. The line of force for the carriages on the right (those being pushed) is through the rear chain 182, down through the rear diagonal side plates 164, across the upper side frame members 155, 156, up through the front diagonal plates 166 and to the elongated tubular link member associated with the carriage on the right of the power units. In the reverse direction wherein the power units 114, 116 are reversely operated to drive the carriages out of the mine (to the left), the rear chain 182 is now in a relaxed condition whereas the front chain 180 will now be in tension and the force lines are opposite to those described in the forward direction.

It will be appreciated by those skilled in the art, that the above described drive coupling relationship of the power units 114, 116 and carriages is such that any deterious forces which may result from the power units moving along the monorail 22 such as the reaction forces of the power units per se produced when the power units move over a disjoined rail section are not transmitted to the framework 154 or the carriages 14. Such mounting arrangement permits the power units 114, 116 freedom of movement relative to the framework 154 in that there are no rigid connections between the two, but only the connection of the chains 180, 182. Furthermore, such chain connections between the power units and the carriages allow the power units to move more freely around a curved section of the monorail rather than would be the case were the power units rigidly connected to the framework.

The framework 154 of the traction drive means 24 also includes parts that support the orbital belt 12 in a manner similar to that of the carriages 14. For example, left and right brackets (not shown) which may be identical in construction to those described in the above described carriage section, are carried respectively by the front and rear upright frame members 160, 162. For the sake of brevity, it should suffice to say that the brackets, as described above, rotatably support the idlers (not shown in FIGS. 14 and 15) associated with the upper conveying run portion 12a of the belt 12 as well as the reverse run portion 12b of the belt.

It will be appreciated by those skilled in the art, that the specific configuration of the traction drive means 24 just described allows for a low profile unit having a height which is approximately equal to that of the carriages, thus permitting operation thereof in confined areas wherein the vein of coal is of low height.

Take-up Carriage

As briefly mentioned hereinabove, the conveyor system 10 is provided with a take-up carriage, being generally indicated by the numeral 26, that is similar in construction to the standard carriage 14 described above but which is adapted to expand and retract in the longitudinally direction so as to increase or decrease the overall longitudinal length of the carriage train. Such expandable/retractable take-up carriage, when associated with a conveyor system of the type shown in the preferred embodiment having a controlled prestretched conveying belt, serves as a means for maintaining the controlled prestretch of the belt under such conditions where the belt chain becomes worn. In addition, when it is desired to decrease the amount of tension in the belt for making repairs, the take-up carriage 26 can be retracted to shorten the length of the carriage train and thereby reducing the tension in the belt 12. Although, in the preferred embodiment as shown in FIG. 2, the take-up carriage 26 is interposed between the outby terminal 16 and traction drive means 24, the take-up carriage 26 may be interposed between adjacent carriages 14 or it may be interposed between the inby terminal 18 and an adjacent carriage. Furthermore, even though only one take-up carriage 26 is shown, there may be more than one in a given carriage train.

Figure 16:
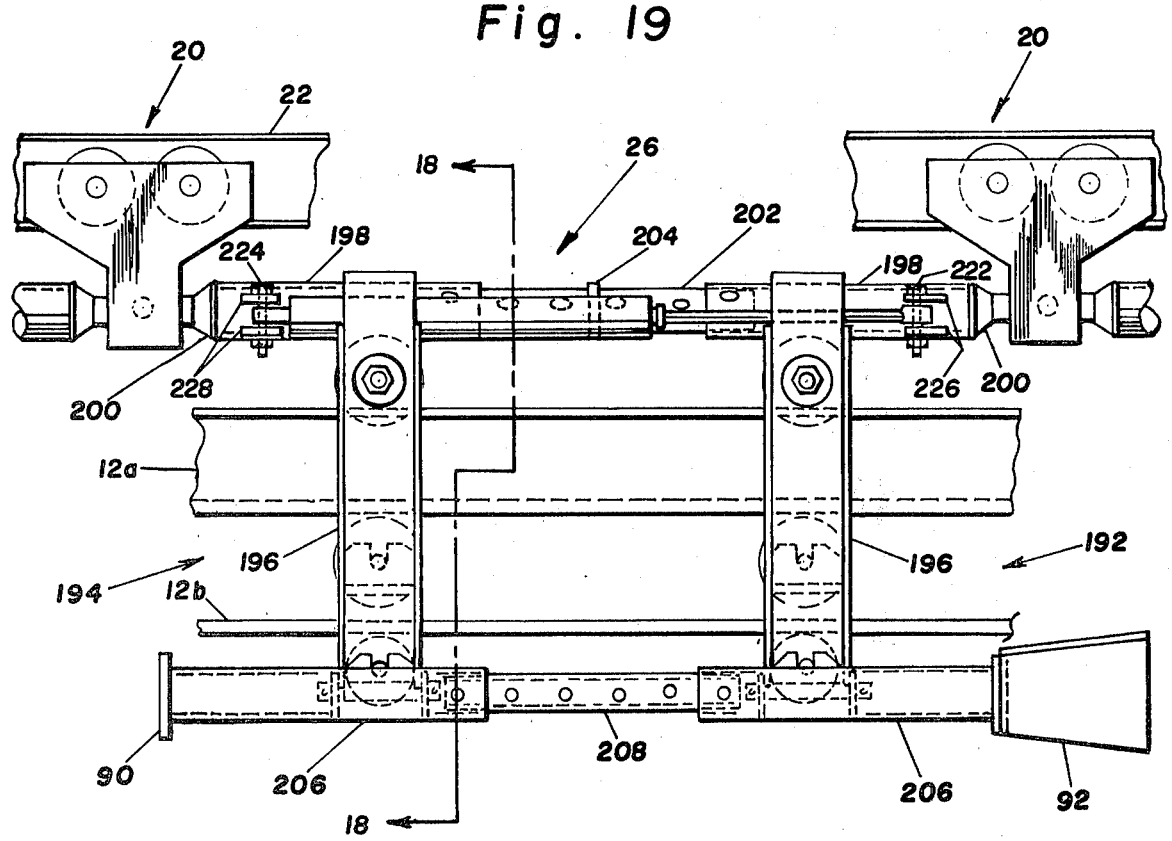
FIG. 16 is an enlarged side elevational view of the take-up carriage shown in FIG. 2.
Figure 17:
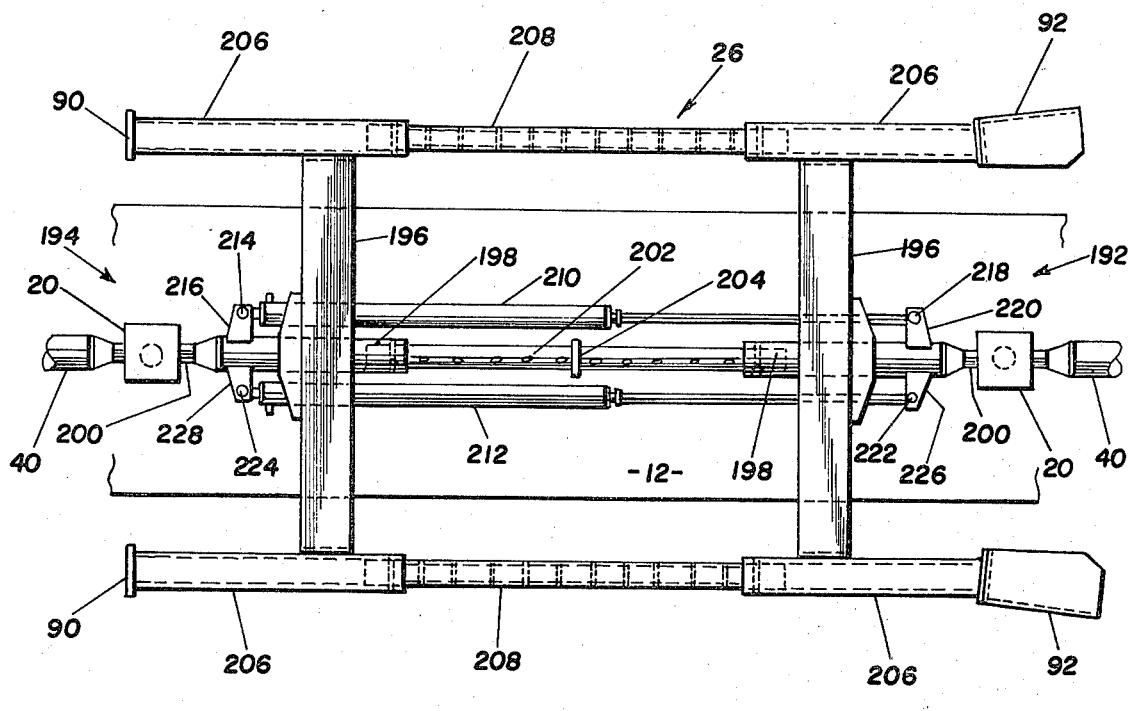
FIG. 17 is a top plan view of the take-up carriage of FIG. 16 showing the hydraulic cylinders.
Figure 18:
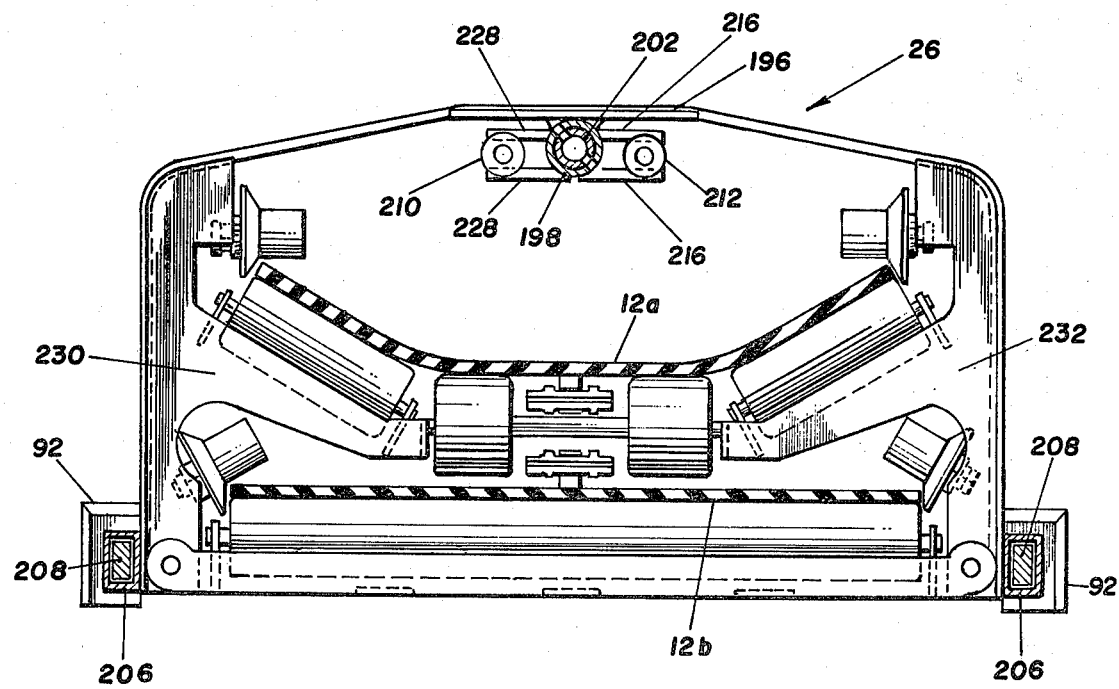
FIG. 18 is a sectional view of the take-up carriage as taken along line 18—18 of FIG. 16.

As seen in FIGS. 16, 17, and 18, the take-up carriage 26 includes a framework similar to that of a standard carriage but which has been divided into two substantially identical portions (FIG. 16), the portion on the right being referred to as the front portion and generally indicated by the numeral 192, and the portion to the left being referred to as the rear portion and generally indicated by the numeral 194. The right or front portion 192 is a mirror image of the left or rear portion 194 (with the exception of the limiting plate structures 90, 92), that is, it is reversely oriented relative to the left or rear portion such that the portions are symmetrical about a transversely extending vertical plane that passes through the longitudinal midsection of the take-up carriage 26. The overall configuration of the take-up carriage 26, when the front and rear portions 192, 194 are coupled together, is similar to the configuration of a standard carriage 14.

The front and rear portions 192, 194 of the take-up carriage 26 each include a downwardly projecting U-shaped frame member 196 respectively having their respective leg portions disposed adjacent the opposite sides of the open extent of the carriage and with its respective bight section disposed adjacent the upper boundary of the open extent. An elongated tubular link member 198 having a yoke 200 on one end is secured to the undersurface of the bight section of each of the respective U-shaped members 196. The yoke ends of the link members 198 extend in a direction away from the opposite longitudinal ends of the take-up carriage 26 and are identical to the yoke members 94 of the standard carriage 14. As in the case of the standard carriage 14, the yoke 200 forms a component of each of the above described articulated joints 20 which suspends the take-up carriage 26 from the monorail 22. As best seen in FIGS. 16 and a short distance past or beyond the respective U-shaped members. The link member 198 of the front and rear portions 192, 194 telescope over an elongated insert tube 202 which is provided with apertures spaced along its longitudinal extent and with a central collar 204 formed about the periphery thereof and located generally at the midsection of the insert tube 202 for centering the insert tube 202 between the ends of the link members 198. For connecting the link members 198 on the centrally positioned insert tube 202 so as to retain the front and rear frame portions 192, 194 in desired spaced apart location, pins (not shown) are passed through apertures provided in the link members 198 and through corresponding apertures of the insert tube 202.

Supported on the lower leg portion of each of the frame members 196 of the front and rear portions 192, 194 of the take-up carriage 26 is an elongated side frame member 206, one being disposed on each opposite side of the open extent. The side members 206 are substantially identical to the side members 50, 52 of the standard carriage 14 and support on the respective ends thereof cooperating upright and L-shaped plate structures 90 and 92 that form the limiting means previously discussed.

For telescopic connection of each of the respective front and rear side members 206, an elongated insert bar 208 is provided which is adapted to be inserted into the ends of the respective side members. The insert bar 208 is provided with spaced apertures therealong whereas each of the inner ends of the side members 206 are provided with an aperture. Connecting pins (not shown) are inserted through the apertures in the ends of the side members 206 and selected apertures in the insert bar 208 so as to retain the side members 206 in selected longitudinally spaced apart positions.

As best seen in FIGS. 16 and 17, means, preferably, in the form of a pair of hydraulic cylinders 210, 212 are provided to couple the front and rear frame portions 192, 194 and are operational for moving the portions toward and away from one another. The left cylinder 210 (as seen in FIG. 18) is disposed adjacent the left side of the link members 198 and has its cylinder end pivotally connected to the rear portion link member by a pin 214 that passes through a pair of vertical spaced apart ear members 216 (see FIG. 18) that are secured to the side of the rear link member and adjacent the yoke end thereof while its piston rod end is pivotally connected to the front portion link member by a pin 218 that passes through vertically spaced ear members 220 (only the upper one being shown in FIG. 17) that are secured to the side of the front link member. The right cylinder 212 extends along the right side of the link members and is pivotally connected in a similar manner by pins 222, 224 passing through respective ear members 226, 228 provided on the right side of each of the front and rear link members.

As can be readily understood, expansion of the cylinders 210, 212 causes the front and rear portions 192, 194 of the take-up carriage framework 26 to move away from one another, thus increasing the total length of the carriage train, resulting in an increase in the tension of the orbital belt 12 and tightening of the chain associated with the belt which has been elongated due to wear. Once the cylinders 210, 212 have extended to a preselected length, the front and rear framework portions 192, 194 are locked in their desired location by passing the connecting pins (not shown) through the side members 206 and associate insert member 208 as well as the connecting pins (not shown) through the link members 198 and the associated insert tube 202. The locking of the front and rear framework portions 192, 194 in their positions insures that they remain in their relative position should a hydraulic failure occur and the cylinders 210, 212 loose pressure.

In situations where repairs are being made to the conveyor, the cylinders 210, 212 are retracted, thus decreasing the tension on the belt to thereby facilitate access to and handling of the belt.

For moveably supporting the orbital belt 12 within the open extent, the take-up carriage 26 is provided with belt support means identical to the means associated with a standard carriage 14. Thus, for the sake of brevity, and to eliminate repetition in description, it should suffice to say that the belt support means associated with the take-up carriage 26 generally includes respective left and right brackets 230, 232 (see FIG. 18) mounted on the respective leg portions of each U-shaped frame members 196 that rotatably support an upper series of idlers for supporting the upper conveying run portion 12a of the belt and a lower series of rollers for supporting the low return run portion 12b of the belt.

Outby Terminal

Figure 19:
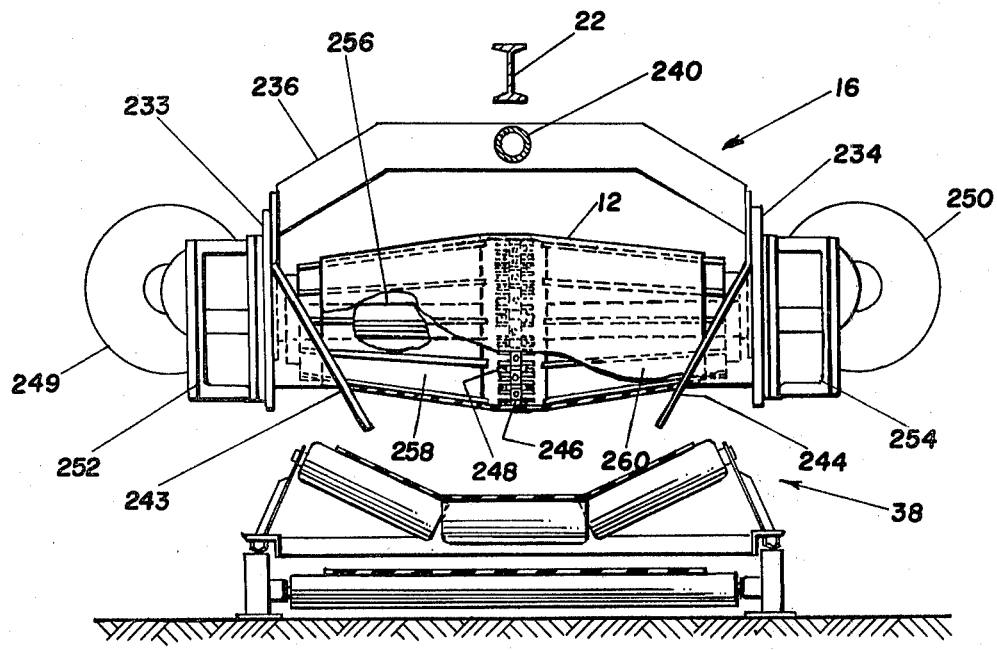
FIG. 19 is an end view showing the outby terminal positioned above the panel belt conveyor as seen from line 19—19 in FIG. 2.

As seen in FIGS. 2 and 19, with particular reference to FIG. 2, connected to the terminal carriage on the extreme left or outward end of the carriage train is a portion of the conveyor commonly known in the conveyor art as an outby terminal, being generally indicated by the numeral 16. This terminal is also suspended, in a like manner to the carriages 14, from the monorail 22 in an elevated position above the panel belt conveyor 38 for discharging of materials on same.

The outby terminal 16 houses means for driving and reversing the direction of the orbital belt 12 and is basically conventional in structure having a framework composed of transversely spaced apart, longitudinally extending frame members 233, 234 (see FIG. 19) disposed on opposite sides of the open extent. The outward ends of the frame members 233, 234 are interconnected by a transversely extending hanger 236 while the opposite ends, or the inward ends of frame members 233, 234 are interconnected by a transversely extending, downwardly projecting, U-shaped frame member 238 as shown in FIG. 2 which similar to U-shaped frame member 196. Mounted to the outward face of hanger 236 and U-shaped member 238 is a short tubular link member 240 having a yoke end portion which forms a portion of the articulated suspension joint 20 associated with the adjacent carriage 14 on one end and a portion of the articulated joint 20 associated with the control box 36 on the other end. Mounted on each of the frame members 233, 234 and projecting forwardly therefrom toward the take-up carriage 26 is a short side member 242 (only the one on the right side being shown in FIG. 2) having mounted to its outward end an L-shaped plate structure, identical to those plate structures 92 associated with the carriages, for cooperating with the adjacent upright plate structure 90 on each end of the side members 206 associated with the take-up carriage 26.

For funneling the mined material onto the panel conveyor 38, a pair of sheet metal skirts 243, 244 are provided on the outward end of the outby terminal 16, one skirt 243 being attached to the outward end of the side frame member 233 and shaped so as to divert the material inwardly toward the longitudinally centerline of the panel belt, whereas the other skirt 244 is attached to the opposite side frame member 234 and so shaped to direct the material in a similar fashion.

Transversely extending between the side frame members 234 is an upper series and a lower series of longitudinally spaced rotatably mounted idlers 245 (only one of which is shown in FIG. 2) for respectively supporting the upper conveying and lower return run portions of the belt 12. It will be noted here that the upper conveying run portion 12a of the belt is normally trough shaped as it passes through the carriages 14, however, the conveying run portion flattens out as it passes around the outby terminal 16.

Before discussing the means for driving the orbital belt 12, it should be pointed out again that the belt shown in the preferred embodiment is of the type shown and described in the aforesaid copending application of Harry R. Becker. Briefly, the belt 12 is comprised of an elongated web of resilient material having a chain 246 attached thereto and extending along the longitudinal length of the web. The chain 246 includes alternating C-shaped links which are attached to the belt and H-shaped links that connect the adjacent C-shaped links and which are adapted to be engaged by a twin-drive sprocket 248 which will be described in further detail hereinafter. Furthermore, the belt is classified as having a controlled prestretch, that is, the belt is in tension in its assembled position on the conveyor. The primary purpose of using a prestretched belt is to maintain the edges of the belt in tension when the belt passes around horizontal curves thereby maintaining the trough shape of the belt. Prestretching of the belt is accomplished by fastening the C-shaped links to the belt in its relaxed position whereby the H-shaped links are in loose connection. Then when the belt is installed on a conveyor, the chain links will be pulled apart by the maximum amount permitted by the loose link connection, to thereby stretch the belt to a predetermined elongation over its relaxed length. Details of the prestretched belt can be found in the above-reference application.

Now, with reference to FIGS. 2 and 19, it will be seen that the belt drive means basically includes electric motors 249, 250 and associated conventional drive components being supported on and extending longitudinally along each of the side frame members 233, 234 of the outby terminal framework (only the motor and associated drive components on the right side are shown in FIG. 2). As best seen in FIG. 19, the respective motors 249, 250 and associated drives are driveably connected to respective left and right gear boxes 252, 254 located on the outward ends of the respective side frame members 233, 234 for transmitting rotary motion to a transversely extending drive shaft 256 that extends between the opposite side frame members. The gear boxes 252, 254 are driveably coupled to the respective ends of the shaft 256 with the drives being such that the shaft is driven in a counterclockwise direction as viewed in FIG. 2. Mounted on the drive shaft 256, midway between the side frame members 234, are a pair of transversely spaced drive sprockets 248 adapted to engage the H-shaped connecting links of the chain 246 for thereby driving the chain and the belt therewith. The configuration of the drive sprockets 248 is unique and will be described in detail hereinafter. Supported on the shaft 256, adjacent each side of the pair of drive sprockets 248, are respective left and right self cleaning frusto-conical shaped drums 258, 260 which are so mounted as to freely rotate about the shaft 256. The frusto-conical shaped drums 258, 260 are so arranged and oriented on the shaft 256 such that the drums 258, 260 in combination with the drive sprockets 248, forces the belt 12 to take on a crown-shaped configuration. Crown shaped belt drives are well known in the art and are primarily used for centering of the belt on the idlers.

Since the belt is prestretched, i.e. in tension, and passes over a crown shaped drive, the center of the belt (that portion of the belt disposed about the drive sprockets) travels at a faster speed than the marginal edge portions. However, the freely rotating side drums 258, 260 will allow the speed of the marginal edge portions to catch up with the center portions thereby substantially eliminating scrubbing of the edges of the belt as would normally occur with those drives wherein the side drums are fixed to the shaft for rotation therewith along with the rotation of the drive sprockets.

Drive Sprockets

As previously discussed, the chain 246 is attached loosely to the belt 12 in a relaxed mode, and then, when it is assembled into the train, the belt is stretched until the chain links are tight. When the chain 246 is in such taut condition, the belt is elongated approximately ten percent (10%). As the chain 246 passes over the drive sprockets 248, the belt travels on a greater radius than the chain and thus, an additional stretch load, in the range of approximately 36%, is imposed on the belt. The free rotating idler drums 258, 260 on each side of the sprockets 248 are tapered outward and are slightly smaller than the sprockets thereby giving a crowning effect to the assembly and functioning to relieve the stretch on the edges of the belt. The greatest concentration of tension in the belt 12 is in the area immediately over the chain 246 and between the chain and belt fasteners (not shown). The tension in this area has been relieved by approximately ten percent (10%) by the unique configuration of the drive sprockets 248 and their operative relationship with the chain 246 which will now be discussed in further detail.

Figure 20:
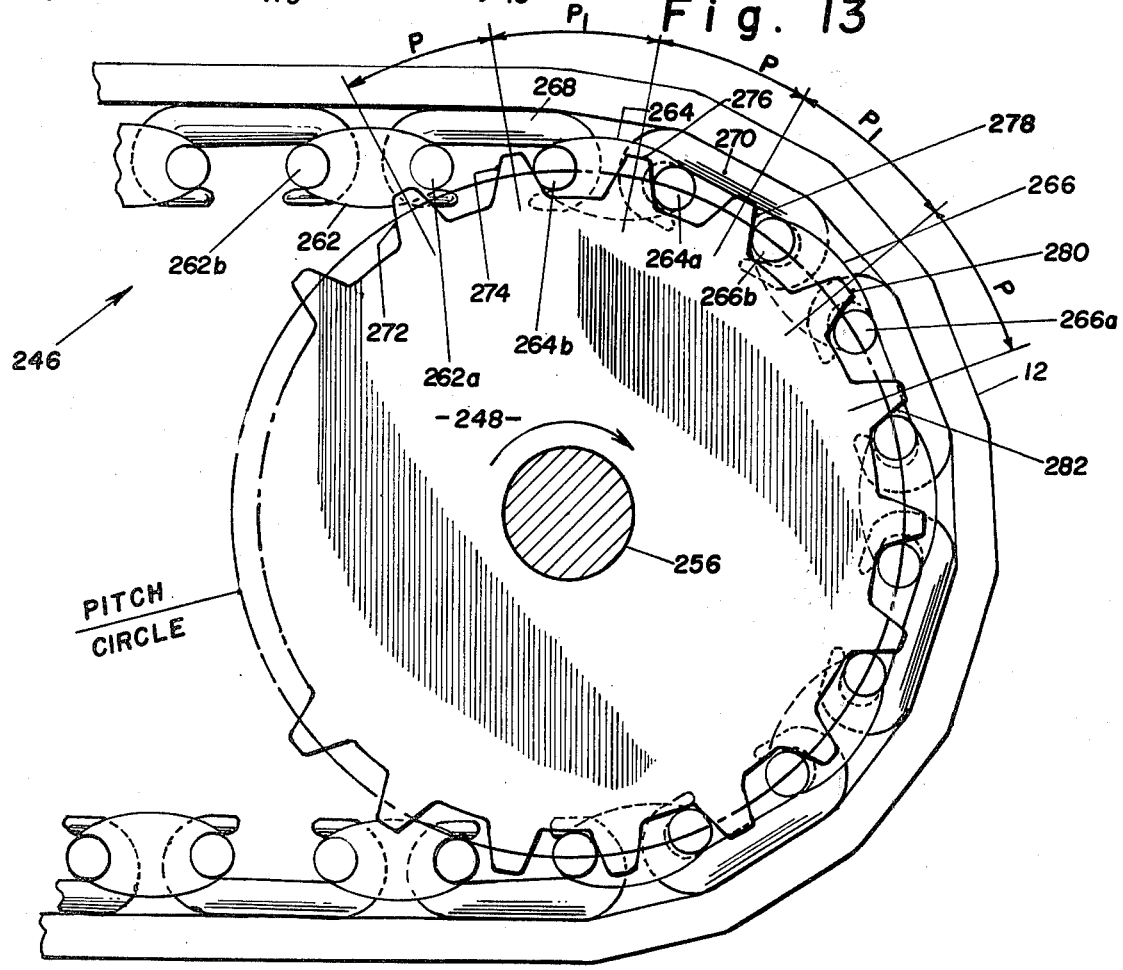
FIG. 20 is a side view of the drive sprocket in engagement with the belt drive chain.

In discussing the drive, reference will be made to FIGS. 19 and 20 and particularly FIG. 20 wherein there is shown, for the sake of clarity, a portion of the chain 246 in drive engagement with a portion of one of the drive sprockets 248 (left sprocket), it being understood that the other one of the drive sprockets engages the opposite side of the chain in a like manner. As discussed above, the chain 246 consists of alternating H-shaped drive links and alternating C-shaped connecting links interposed between adjacent H-links. As seen in FIG. 20 and for simplicity in explanation, reference numerals 262, 264, and 266 have been assigned to three of the H-shaped links and reference numerals 268 and 270 have been assigned to the connecting links. Additionally, the letters "a" and "b" have been assigned respectively to the outwardly projecting cylindrical front and rear portions of each of the H-shaped links 262, 264, and 266. The chain per se is not a part of this invention and is described and claimed in the above referred to patent application. Furthermore, it should be said that this particular chain is shown for illustrational purposes only and is one type chain which cooperates with the drive sprockets 248, there being other such chains of different designs which will also cooperate with the drive sprockets so as to relieve the additional tension inparted to the prestretched belt 12 as it passes over the drive sprockets 248.

Still referring to FIG. 20, the drive sprocket 248 is driven in a clockwise direction (as indicated by the direction arrow) and its unique configuration includes a plurality of alternating pitch drive teeth, being represented by numerals 272 through 282, formed about its periphery with the circular pitch between teeth 272-274, 276-278 and 280-282 being represented by "p"; and with the circular pitch between teeth 274-276 and 276-278 being represented by "p$_1$"; "p" being greater than "p$_1$". It will also be noted that "p" represents the pitch of each of the H-shaped drive links 264, 266 and 268. As the chain passes over and partially around the sprocket 248, drive tooth 272 initially engages drive portion 262a of link 262. When the chain is taut and in its linear position, the distance between adjacent drive links is also "p" i.e. the distance between 262a of link 262 and 264b of link 264, and thus the pitch of the connecting links is "p". However, in the meantime, tooth 274 has engaged drive portion 264b of link 264. Then upon further rotation of the sprocket, tooth 274 forces the link 264 forward thereby causing a gap (non-contacting relationship) portion of the connecting link 270 thereby resulting in relaxation of link 270 toward link 268. Such relaxation of the chain beginning at tooth 276 allows contraction of the belt, thereby relieving the tension in the portion of the belt between the fastner elements (not shown) that attach the connecting links 268, 270 of the chain to the belt. A similar sequence of events occur with tooth 278 and link 264 as well as with the other preceding teeth and links. As a result, the total relaxation of all of the links of that portion of the chain passing over the sprocket teeth at any given point of time relieves the increased tension in the belt due to its passing over the drive sprockets 248.

Inby Terminal

Again referring to FIG. 2, connected to the terminal carriage on the extreme right or inward end of the carriage train is a portion of the conveyor system commonly known in the conveyor art as an inby terminal, being generally indicated by the numeral 18. The inby terminal 18 is similar in structure to the previously described outby terminal 16. In the preferred embodiment, the inby terminal 18 houses means for driving the orbital belt 12 from its opposite end which is substantially identical to the belt drive means associated with the outby terminal 16. Due to the length of the conveyor system, and thus the length of the orbital belt 12, it has been found to be advantageous to drive the orbital belt 12 from each of its ends. Primarily, the belt drive means associated with the inby terminal 18 pulls the return run portion 12b of the belt and keeps this portion taut, whereas, the belt drive means associated with the outby terminal 16 pulls the upper conveying run portion 12a of the belt to keep it taut.

Figure 21:
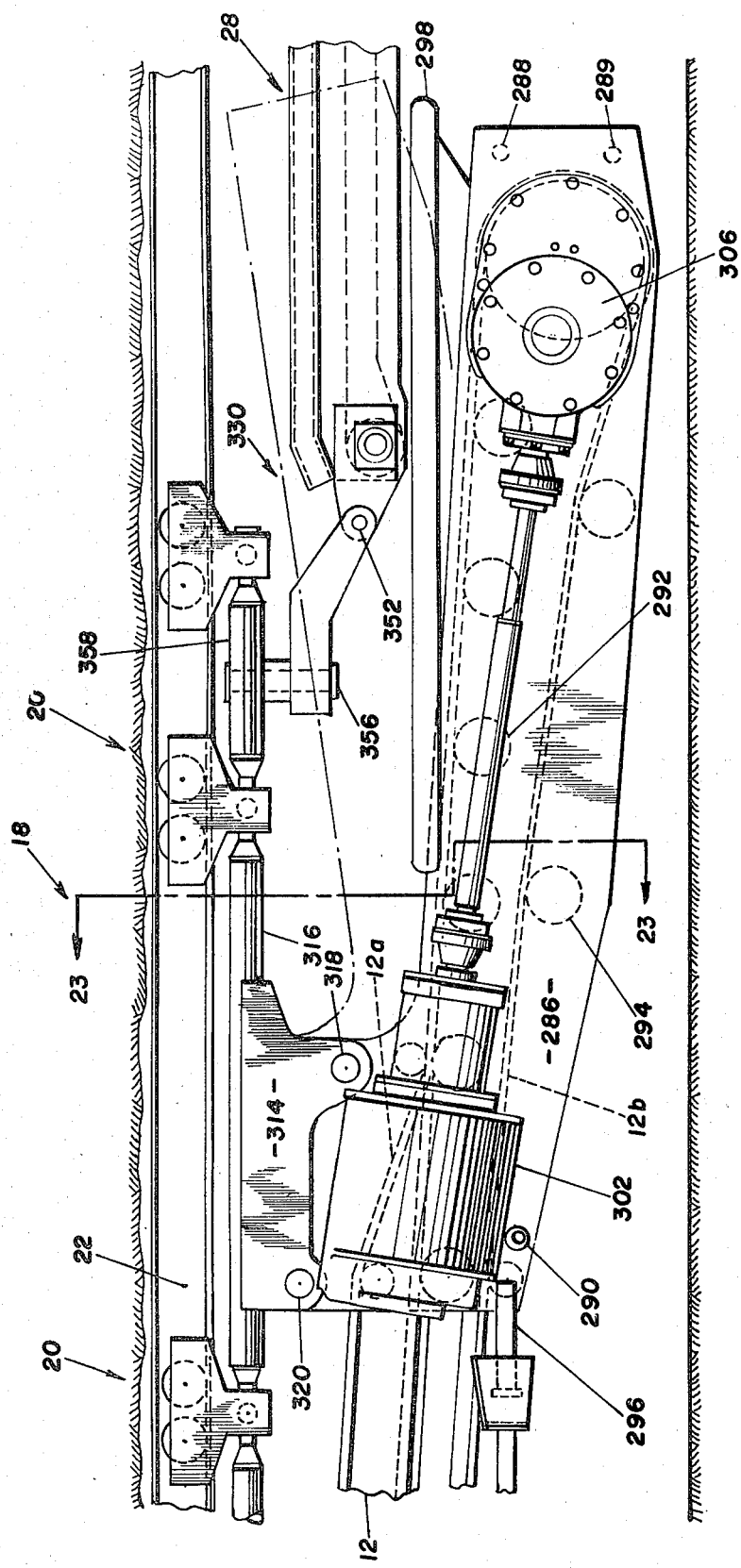
FIG. 21 is an enlarged side elevational view of the inby terminal as seen in FIG. 2 showing in dotted lines the pivoted movement thereof and with the load discharge end of the bridge conveyor being shown in its elevated overlyng position above the inby terminal.
Figure 22:
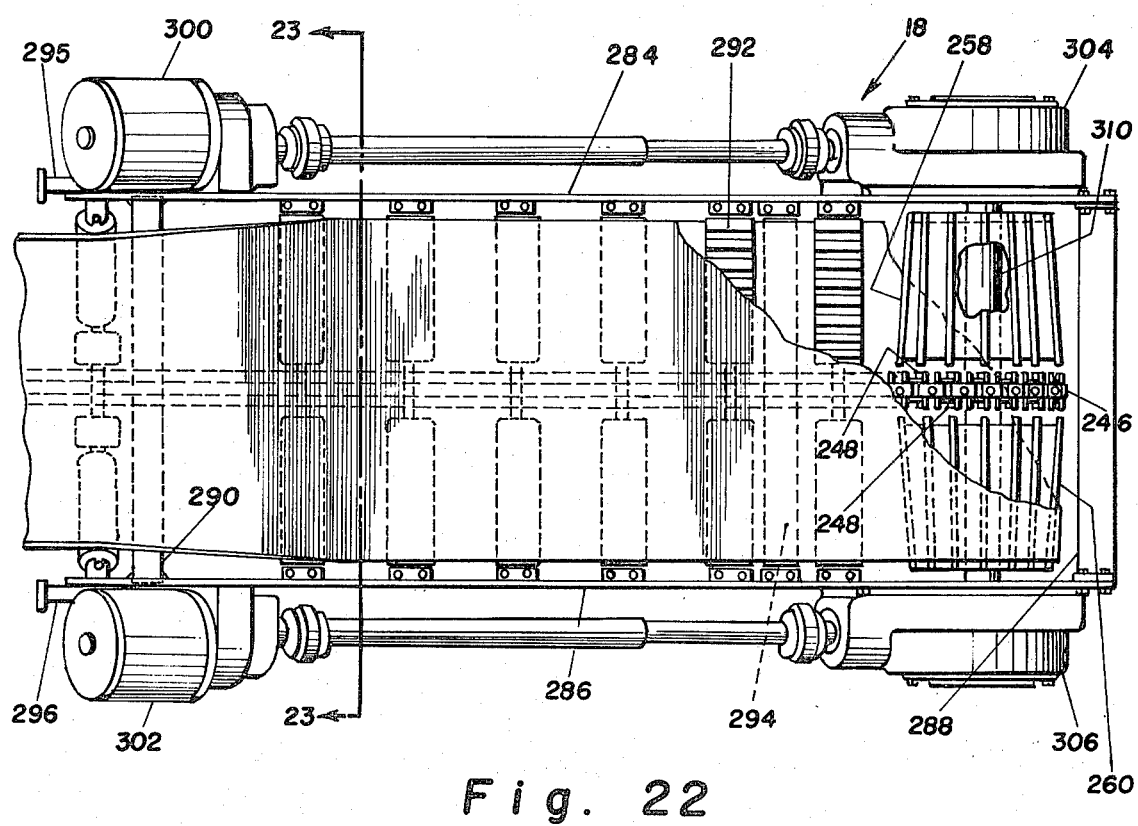
FIG. 22 is a top plan view of the inby terminal with the hopper removed.
Figure 23:
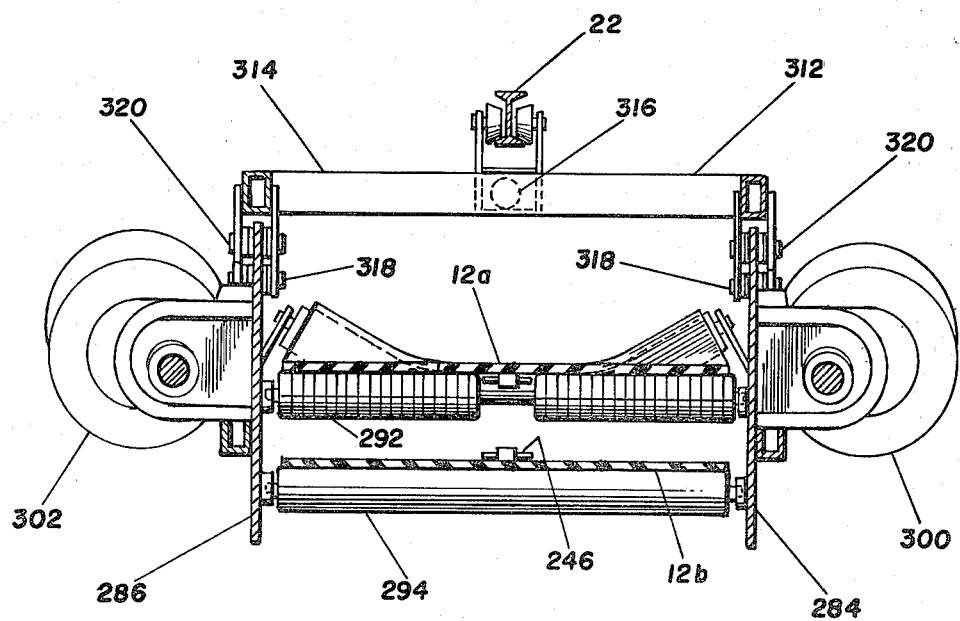
FIG. 23 is a sectional view of the inby terminal as taken along line 23—23 in FIG. 22.

As seen in FIGS. 21, 22 and 23 with particular reference to FIG. 22, the inby terminal 18 includes a support framework composed of a pair of transversely spaced elongated side plates disposed adjacent the opposite lateral sides of the open extent, the left side plate being referred to by the numeral 284 while the right side plate being referred to by the numeral 286. The inward ends (to the right as seen in FIG. 22) of the side plates 284, 286 are interconnected by upper and lower transversely extending vertically spaced cross bars 288, 289, with only the upper bar 288 being shown in FIG. 22. The outward ends (to the left) of the side plates 284, 286 are interconnected by a similar cross bar 290. Transversely extending between the side plates 284, 286 are an upper series of longitudinal spaced, conventional, impact idlers 292, for supporting the upper conveying run portion of the belt 12 and a lower series of longitudinal spaced, conventional idlers 294 for supporting the return run portion of the belt. Mounted on the lower portion of the outward (left) end of the side plates 284, 286 are short stub side members 295, 296 that project outwardly therefrom toward the adjacent carriage 14 for cooperation with the L-shaped plate structure 92 carried by the side members 52 of the adjacent carriage for purposes of limiting lateral movement of the carriage as previously described.

The inby terminal 18 is also provided with a hopper 298 (not shown in FIG. 22) for directing the material discharge from the bridge conveyor 28 onto the conveying run portion of the orbital belt 12. The hopper 298 is supported on the top edge of the side plates 284, 286 and extends upwardly and outwardly therefrom with continuous transition portions extending above and between the side plates.

Referring still to FIGS. 21, 22 and 23, as stated above, the belt drive means may be identical to the one associated with the outby terminal 16 and generally includes left and right electric motors 300, 302, respectively disposed adjacent the outer sides of the respective side plates 284, 286. The motors 300, 302 are driveably coupled, by conventional drive components, to respective left and right gear boxes or reducers 304, 306 attached to the other (inward) end of the side plates. The gear boxes 304, 306 are driveably coupled to the respective ends of a drive shaft 310 that transversely extends between the side plates 284, 286. The drive shaft 310 supports for rotary movement therewith a pair of drive sprockets (identical to previously described drive sprockets 248) for driveable engagement with the chain 246 which is attached to the longitudinal centerline of the belt. Additionally, the shaft 310 supports, on each side of the drive sprockets, a pair of self cleaning drums which are identical to drums 258, 260.

As best seen in FIGS. 21 and 23, the inby terminal 18 is suspended from its end adjacent the carriage 14 by respective left and right brackets 312, 314 (only the right bracket 314 being seen in FIG. 21). The brackets 312, 314 are secured to the respective sides of an elongated tubular link member 316 which is disposed below the monorail 22 with the ends thereof forming portions of the articulated joints 20 which may be identical to those described previously. The brackets 312, 314 project downwardly and outwardly from the link member with their respective terminal portions being positioned adjacent the outer surface of the upper end portions of the side plates 284, 286. Each of the brackets 312, 314 is attached to a corresponding side plate by two pins, a forward attaching pin 318 and a rear pivot pin 320.

As can be easily seen, the mounting of the inby terminal 18 is such that upon removal of the forward attaching pins 318, the inby terminal 18 can be pivoted about the pivot pins 320 upwardly from its operative mode position (as shown in full lines) to its inoperative transport mode position as shown in dotted lines in FIG. 21. Such pivoted mounting of the inby terminal 18 is necessary when it is desired to move the conveyor outwardly (to the left) of the mine, because the inward end of the inby terminal is positioned below the upper portion of the panel belt conveyor 38. It should also be easily recognized that before the inby terminal 18 is pivoted from its operative to inoperative mode, the bridge conveyor 28 must first be disconnected.

Bridge Conveyor

Figure 24:
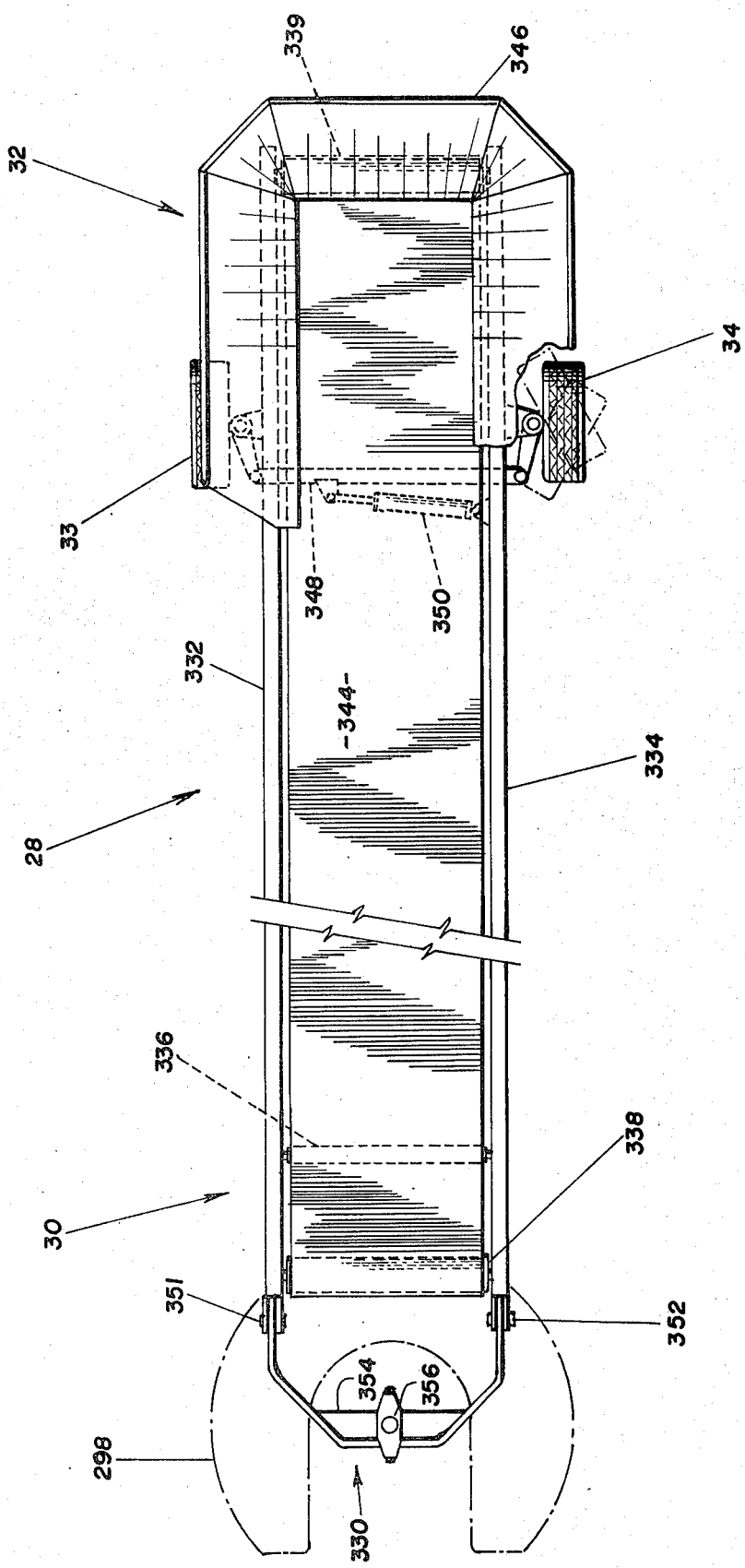
FIG. 24 is a top plan view of the bridge conveyor as shown in FIG. 2 showing the steerable wheels in two different positions.

For dumping mined material on the orbital belt 12 at the inby terminal end of the carriage train, the conveyor system 10 also includes an elongated bridge conveyor 28 connected to the inward end of the carriage train, inwardly and adjacent to the inby terminal 18 (see FIG. 2). As seen in FIGS. 2 and 24, the bridge conveyor 28 is of conventional construction having a material receiving end 32 that follows a continuous miner (not shown) and a delivery end 30 positioned above and connected to the inby terminal 18 for delivering the materials from the mining machine to the orbital belt of the carriage train. The receiving end 32 of the bridge conveyor 28 is supported on a pair of remotely controlled steerable wheels 33, 34 whereas the delivery end 30 is connected in its elevated position to the inby terminal 18 with a swivel mechanism 330 thereby enabling the receiving end 32 to swing in a horizontal plane so as to follow the mining machine through its various maneuvers.

Bridge conveyors are well known in the art and are of such common types as an endless belt, an apron conveyor, a flight conveyor, and the like. In the preferred embodiment of this invention, there is diagrammatically illustrated (FIGS. 2 and 24) an endless belt conveyor operably supported within an elongated framework having left and right sidewalls 332, 334. Rotatably supported between the sidewalls 332, 334 of the framework are several transversely extending belt support rollers 336 (only one of which being shown in FIGS. 2 and 24), drum rollers 338, 339 located at the terminal ends of the bridge conveyor, a belt drive drum 340 and a take-up drum or pulley 342 (see FIG. 2) which is operably associated with the drive drum 340. For simplicity, drive drum 340 and take-up pulley 342 have not been shown in Fig. 24. An endless belt 344 is entrained around these various drums and pulleys and is frictionally driven by the drive drum 340 which is rotated by conventional power units such as electric motors (not shown).

For directing or funneling the mined material from the mining machine onto the bridge conveyor 18, a rectangular shaped hopper 346 is provided on the receiving end of the bridge conveyor. Additionally, supported on the receiving end 30 are the steerable wheels 33, 34 mounted on spindles that are attached to opposite sidewalls 332, 334 of the framework and which are inter-connected by a transverse tie rod 348. A hydraulic cylinder 350 having its piston rod connected to the tie rod 348 and its opposite end connected to a portion of the framework is provided for shifting the tie rod 348 and thus causing the wheels 33, 34 to turn in a conventional manner. The steering mechanism is only illustrative of any conventional well known mechanism and it should suffice to say that extension of the cylinder 350 causes the wheels 33, 34 to turn in one direction whereas retraction of the cylinder 350 causes the wheels 33, 34 to turn in the opposite direction. The hydraulic hose connection and controls have not been shown but it is understood that movement of the wheels 33, 34 can be controlled from a remote location such as by an operator positioned in a location adjacent the inby terminal 18.

The other end of the bridge conveyor 28, the delivery end 30, is positioned above and connected to the inby terminal 18 and suspended from the monorail 22 by the swivel mechanism 330 that includes an arcuate shaped tongue or clevis having its respective ends attached to the end of the framework by attaching pins 351, 352 (see FIG. 24). A horizontal plate 354 is secured along the bight portion of the tongue and is provided with an aperture for receiving a vertical pivot pin 356 that extends upwardly therethrough and through an aperture in an elongated tubular link member 358 that is supported by longitudinally spaced articulated joints of the types previously described.

As can be readily appreciated, the mounting of the bridge conveyor 28 is such that it moves in unison with the movement of the carriage train and inby terminal 18 and that the receiving end 32 thereof, due to the swivel coupling 330, can swing to side to side to thereby follow the mining machine.

It is thought that the invention and many of its attendant advantages will be understood from the foregoing description and it will be apparent that various changes may be made in form, construction and arrangement of the conveyor system without departing from the spirit and scope of the invention or sacrificing all of its material advantages, the form hereinabove described being merely a preferred or exemplary embodiment thereof.

Having thus described the invention, what is claimed is:

1. In an elongated conveyor having an orbital material conveying belt of the type comprising an elongated web of resilient material and a chain attached to and extending along the longitudinal length of said web, said belt extending between and about rotatable means disposed at opposite ends of said belt for maintaining said belt in tension and driving same, the improvement comprising:

at least one of said rotatable means including a drive sprocket having alternating space teeth in a plurality of sets thereof, each of said teeth having a leading drive surface engaging said chain, each set including first and second teeth being spaced a given distance from each other on a pitch circle defined about said sprocket and with the second and third teeth being spaced a distance less than said given distance whereby upon engagement of said teeth with said chain adjacent links of said chain are moved closer together to thereby relieve some of the increased tension in said belt caused by the chain passing around said sprocket.

* * * * *